US010795774B2

(12) United States Patent
Pandey et al.

(10) Patent No.: US 10,795,774 B2
(45) Date of Patent: Oct. 6, 2020

(54) DISASTER RECOVERY OF ARCHIVED DATA

(71) Applicant: RUBRIK, INC., Palo Alto, CA (US)

(72) Inventors: Prateek Pandey, Santa Clara, CA (US); Arpit Agarwal, Mountain View, CA (US)

(73) Assignee: Rubrik, Inc., Palo Alto, CA (US)

( * ) Notice: Subject to any disclaimer, the term of this patent is extended or adjusted under 35 U.S.C. 154(b) by 178 days.

(21) Appl. No.: 15/876,104

(22) Filed: Jan. 19, 2018

(65) Prior Publication Data

US 2019/0227877 A1    Jul. 25, 2019

(51) Int. Cl.
*G06F 11/14*     (2006.01)
*G06F 9/455*     (2018.01)
*G06F 16/11*     (2019.01)

(52) U.S. Cl.
CPC ...... *G06F 11/1451* (2013.01); *G06F 9/45558* (2013.01); *G06F 16/128* (2019.01); *G06F 2201/815* (2013.01); *G06F 2201/84* (2013.01)

(58) Field of Classification Search
CPC ............ G06F 9/45504; G06F 9/45558; G06F 2009/45583; G06F 11/1451; G06F 11/1458
USPC .......................................... 714/15, 19; 718/1
See application file for complete search history.

(56) References Cited

U.S. PATENT DOCUMENTS

| | | | | |
|---|---|---|---|---|
| 8,037,032 B2* | 10/2011 | Pershin | .............. | G06F 11/1451 707/602 |
| 8,364,639 B1* | 1/2013 | Koryakina | .......... | G06F 11/1458 707/639 |
| 9,189,342 B1* | 11/2015 | von Thenen | ........ | G06F 9/45558 |
| 10,146,634 B1* | 12/2018 | Bishop | ............... | G06F 11/1458 |
| 10,275,321 B1* | 4/2019 | Bajaj | ................... | G06F 11/1464 |
| 2015/0127618 A1* | 5/2015 | Alberti | .................. | G06F 16/128 707/678 |
| 2015/0324260 A1* | 11/2015 | Mutalik | .............. | G06F 9/45558 714/703 |
| 2016/0124665 A1* | 5/2016 | Jain | ........................ | G06F 16/13 711/162 |

* cited by examiner

*Primary Examiner* — Joseph R Kudirka
(74) *Attorney, Agent, or Firm* — Schwegman Lundberg & Woessner, P.A.

(57) ABSTRACT

Methods and systems for efficiently downloading archived snapshot data from the cloud or from an archival data store are described. In a disaster recovery scenario in which an entire storage appliance for backing up different point in time versions of a virtual machine has failed (e.g., due to a fire), archived snapshot data for the different point in time versions may be acquired by a second storage appliance from an archival data store (e.g., cloud-based data storage) using one or more snapshot mapping files. A snapshot mapping file may include pointers to a plurality of data blocks within the archival data store for generating a full image snapshot associated with a particular point in time version of the virtual machine. The plurality of data blocks may comprise the minimum number of data blocks necessary to construct the particular point in time version of the virtual machine.

18 Claims, 21 Drawing Sheets

```
Virtual Machine A, Version V7 {
    pBase,          ——▶  /snapshots/VM_A/s5/s5.full
    pF1,            ——▶  /snapshots/VM_A/s6/s6.delta
    pF2             ——▶  /snapshots/VM_A/s7/s7.delta
}
```

```
Virtual Machine A, Version V2 {
    pBase,          ——▶  /snapshots/VM_A/s5/s5.full
    pR1,            ——▶  /snapshots/VM_A/s4/s4.delta
    pR2,            ——▶  /snapshots/VM_A/s3/s3.delta
    pR3             ——▶  /snapshots/VM_A/s2/s2.delta
}
```

Versions of Virtual Machine A        Stored Files

Virtual Machine A, Version V7 {
    pBase2,            ⟶    /snapshots/VM_A/s7/s7.full
}

Virtual Machine A, Version V2 {
    pBase2,            ⟶    /snapshots/VM_A/s7/s7.full
    pR11,              ⟶    /snapshots/VM_A/s6/s6.delta
    pR12,              ⟶    /snapshots/VM_A/s5/s5.delta
    pR1,               ⟶    /snapshots/VM_A/s4/s4.delta
    pR2,               ⟶    /snapshots/VM_A/s3/s3.delta
    pR3                ⟶    /snapshots/VM_A/s2/s2.delta
}

Virtual Machine B, Version V1 {
    pBase,
    pR1,
    pR2,
    pF3
}

Virtual Machine C, Version V2 {
    pBase,
    pF1,
    pF5,
    pF6
}

Virtual Machine B, Version V1 {
    pBase2,
    pR11,
    pR12,
    pR1,
    pR2,
    pF3
}

Virtual Machine C, Version V2 {
    pBase2,
    pR11,
    pF5,
    pF6
}

Virtual Machine A, Version VS {
    pBaseA,
    pR4,
}

Virtual Machine A, Version VU {
    pBaseB,
    pR1,
    pR2,
    pR3
}

FIG. 2N      FIG. 2O

```
Virtual Machine A, Version VU {
    pBaseA,
    pF9
}
```

Versions of File X on Virtual Machine A

Version X1 of File X saved at Time T1 ⟶ Version A23 of Virtual Machine A
Version X2 of File X saved at Time T2 ⟶ Version A45 of Virtual Machine A
Version X3 of File X saved at Time T3 ⟶ Version A58 of Virtual Machine A
Version X4 of File X saved at Time T4 ⟶ Version A72 of Virtual Machine A Versions of File Y on Virtual Machine A Version Y1 of File Y saved at Time T2 ⟶ Version A45 of Virtual Machine A
Version Y2 of File Y saved at Time T8 ⟶ Version A95 of Virtual Machine A

FIG. 3D

Virtual Machine A, Version A45 {
    pBase,     ⟶ /snapshots/VM_A/s100/s100.full
    pR1,     ⟶ /snapshots/VM_A/s99/s99.delta
    pR2,     ⟶ /snapshots/VM_A/s98/s98.delta
    ⋮
    pR54,     ⟶ /snapshots/VM_A/s46/s46.delta
    pR55     ⟶ /snapshots/VM_A/s45/s45.delta
}

FIG. 3E

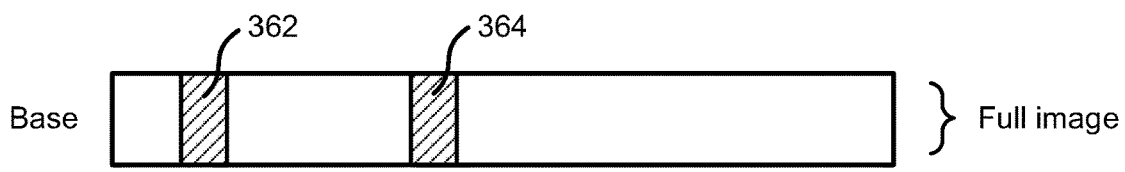

FIG. 3F

Virtual Machine A, Snapshot S3 {
    pBlock460,
    pBlock491,
    pBlock492,
    pBlock473,
    . . .
    pBlock497
}

Virtual Machine A, Snapshot S2 {
    pBlock460,
    pBlock471,
    pBlock482,
    pBlock473,
    . . .
    pBlock467
}

Virtual Machine A, Snapshot S1 {
    pBlock460,
    pBlock471,
    pBlock462,
    pBlock473,
    . . .
    pBlock467
}

Virtual Machine A, Snapshot S0 {
    pBlock460,
    pBlock461,
    pBlock462,
    pBlock463,
    . . .
    pBlock467
}

DISASTER RECOVERY OF ARCHIVED DATA

BACKGROUND

Virtualization allows virtual hardware to be created and decoupled from the underlying physical hardware. For example, a hypervisor running on a host machine or server may be used to create one or more virtual machines that may each run the same operating system or different operating systems (e.g., a first virtual machine may run a Windows® operating system and a second virtual machine may run a Unix-like operating system such as OS X®). A virtual machine may comprise a software implementation of a physical machine. The virtual machine may include one or more virtual hardware devices, such as a virtual processor, a virtual memory, a virtual disk, or a virtual network interface card. The virtual machine may load and execute an operating system and applications from the virtual memory. The operating system and applications executed by the virtual machine may be stored using the virtual disk. The virtual machine may be stored (e.g., using a datastore comprising one or more physical storage devices) as a set of files including a virtual disk file for storing the contents of the virtual disk and a virtual machine configuration file for storing configuration settings for the virtual machine. The configuration settings may include the number of virtual processors (e.g., four virtual CPUs), the size of a virtual memory, and the size of a virtual disk (e.g., a 10 GB virtual disk) for the virtual machine.

BRIEF DESCRIPTION OF THE DRAWINGS

FIG. 3D depicts one embodiment of a virtual machine search index.

FIG. 3E depicts one embodiment of a merged file for the version A45 of Virtual Machine A referred to in FIG. 3D.

FIG. 3F depicts one embodiment of a first portion of a base image and a second portion of the base image.

DETAILED DESCRIPTION

Figure 1A:
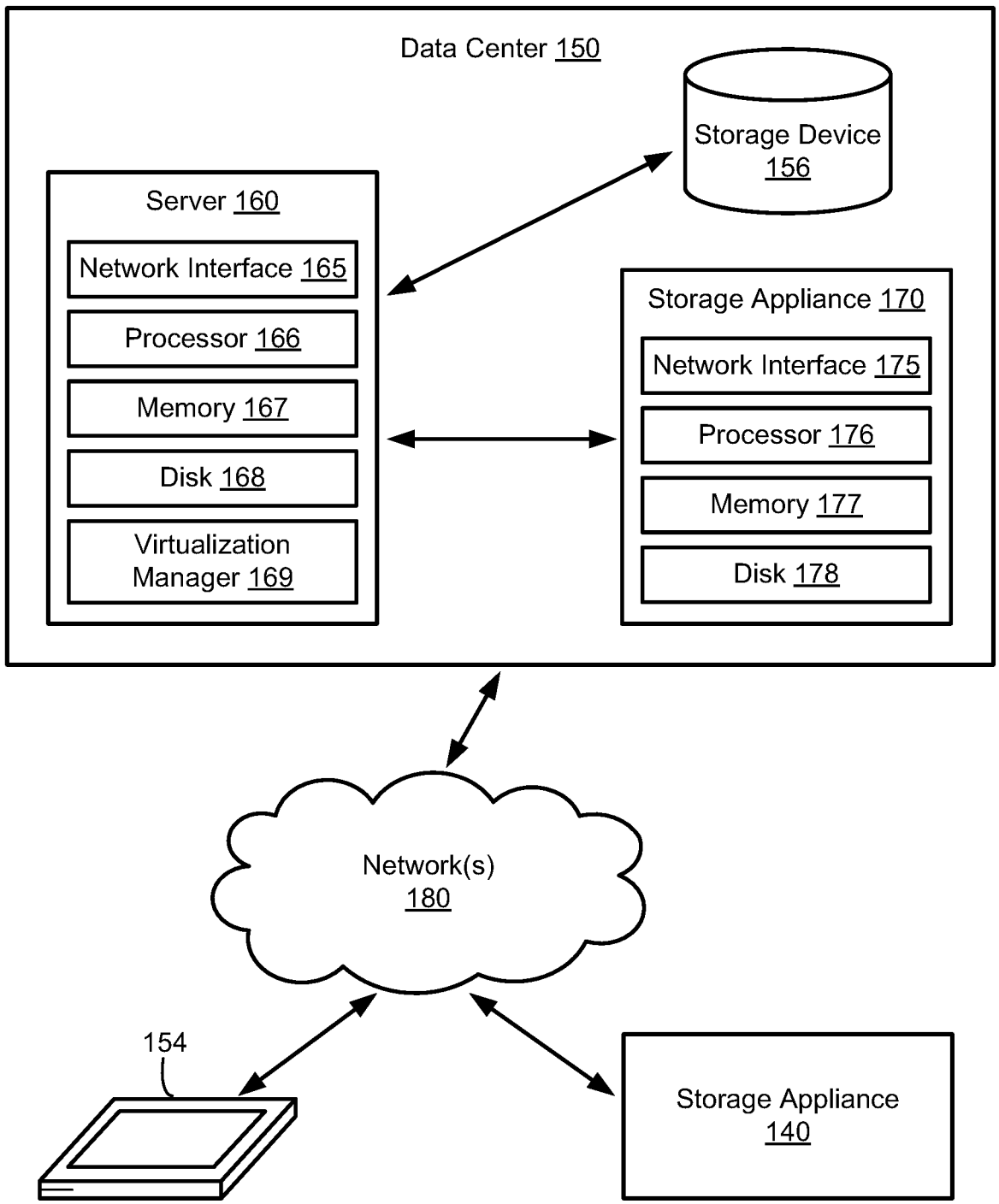
FIG. 1A depicts one embodiment of a networked computing environment.

Technology is described for efficiently downloading archived snapshot data from the cloud or from an archival data store. In a disaster recovery scenario in which an entire storage appliance for backing up different point in time versions of a virtual machine, virtual disk, database, or electronic file has failed (e.g., due to a fire or power failure), archived snapshot data for the different point in time versions may be acquired by a second storage appliance from an archival data store (e.g., a cloud-based data store, an NFS datastore, a storage area network storage device, a networked-attached storage device, or a hardware data storage device) using one or more snapshot mapping files corresponding with the different point in time versions. A snapshot mapping file may comprise a merged journal file. In one example, the snapshot mapping file may include pointers to a plurality of data blocks within the archival data store for generating a full image snapshot associated with a particular point in time version of a virtual machine. The plurality of data blocks may comprise the minimum number of data blocks necessary to generate or construct the particular point in time version of the virtual machine. One benefit of being able to download the minimum number of data blocks necessary to construct any full image snapshot is that the time required to download and generate the full image snapshot may be reduced. Moreover, the data transfer costs for downloading the data blocks necessary to construct the full image snapshot may be reduced.

The ability to download the archived snapshot data directly from the archival data store may enable a one writer, many listeners situation in which a primary storage appliance may capture or acquire snapshots and then write snapshot data for archiving the snapshots to the archival data store. The snapshot data may comprise a plurality of data blocks (e.g., 150 64 MB data blocks) corresponding with a particular snapshot and a snapshot mapping file for constructing the particular snapshot using the plurality of data blocks. The plurality of data blocks may be deduplicated and/or compressed prior to being transferred or uploaded to the archival data store. Thereafter, one or more other storage appliances may connect to the archival data store and read the snapshot data directly from the archival data store (e.g., for remote testing or development purposes) without impacting the performance of the primary storage appliance.

An integrated data management and storage system may be configured to manage the automated storage, backup, deduplication, replication, recovery, and archival of data within and across physical and virtual computing environments. The integrated data management and storage system may provide a unified primary and secondary storage system with built-in data management that may be used as both a backup storage system and a "live" primary storage system for primary workloads. In some cases, the integrated data management and storage system may manage the extraction and storage of historical snapshots associated with different point in time versions of virtual machines and/or real machines (e.g., a hardware server, a laptop, a tablet computer, a smartphone, or a mobile computing device) and provide near instantaneous recovery of a backed-up version of a virtual machine, a real machine, or one or more files residing on the virtual machine or the real machine. The integrated data management and storage system may allow backed-up versions of real or virtual machines to be directly mounted or made accessible to primary workloads in order to enable the near instantaneous recovery of the backed-up versions and allow secondary workloads (e.g., workloads for experimental or analytics purposes) to directly use the integrated data management and storage system as a primary storage target to read or modify past versions of data.

The integrated data management and storage system may include a distributed cluster of storage nodes that presents itself as a unified storage system even though numerous storage nodes may be connected together and the number of connected storage nodes may change over time as storage nodes are added to or removed from the cluster. The integrated data management and storage system may utilize a scale-out node based architecture in which a plurality of data storage appliances comprising one or more nodes are in communication with each other via one or more networks. Each storage node may include two or more different types of storage devices and control circuitry configured to store, deduplicate, compress, and/or encrypt data stored using the two or more different types of storage devices. In one example, a storage node may include two solid-state drives (SSDs), three hard disk drives (HDDs), and one or more processors configured to concurrently read data from and/or write data to the storage devices. The integrated data management and storage system may replicate and distribute versioned data, metadata, and task execution across the distributed cluster to increase tolerance to node and disk failures (e.g., snapshots of a virtual machine may be triply mirrored across the cluster). Data management tasks may be assigned and executed across the distributed cluster in a fault tolerant manner based on the location of data within the cluster (e.g., assigning tasks to nodes that store data related to the task) and node resource availability (e.g., assigning tasks to nodes with sufficient compute or memory capacity for the task).

The integrated data management and storage system may apply a data backup and archiving schedule to backed-up real and virtual machines to enforce various backup service level agreements (SLAs), recovery point objectives (RPOs), recovery time objectives (RTOs), data retention requirements, and other data backup, replication, and archival policies across the entire data lifecycle. For example, the data backup and archiving schedule may require that snapshots of a virtual machine are captured and stored every four hours for the past week, every day for the past six months, and every week for the past five years.

As virtualization technologies are adopted into information technology (IT) infrastructures, there is a growing need for recovery mechanisms to support mission critical application deployment within a virtualized infrastructure. However, a virtualized infrastructure may present a new set of challenges to the traditional methods of data management due to the higher workload consolidation and the need for instant, granular recovery. The benefits of using an integrated data management and storage system include the ability to reduce the amount of data storage required to backup real and virtual machines, the ability to reduce the amount of data storage required to support secondary or non-production workloads, the ability to provide a non-passive storage target in which backup data may be directly accessed and modified, and the ability to quickly restore earlier versions of virtual machines and files stored locally or in the cloud.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system. The one or more networks 180 may include a cellular network, a mobile network, a wireless network, a wired network, a secure network such as an enterprise private network, an unsecure network such as a wireless open network, a local area network (LAN), a wide area network (WAN), and the Internet.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The server 160 may comprise a production hardware server. The storage appliance 170 may include a data management system for backing up virtual machines, real machines, virtual disks, real disks, and/or electronic files within the data center 150. The server 160 may be used to create and manage one or more virtual machines associated with a virtualized infrastructure. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients. One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. For example, the virtualization manager 169 may manage the provisioning of virtual machines running within the virtualized infrastructure and provide an interface to computing devices interacting with the virtualized infrastructure. The virtualization manager 169 may also perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of one or more virtual machines.

In another embodiment, the storage appliance 170 may comprise a virtual appliance that comprises four virtual machines. Each of the virtual machines in the virtual appliance may have 64 GB of virtual memory, a 12 TB virtual disk, and a virtual network interface controller. In this case, the four virtual machines may be in communication with the one or more networks 180 via the four virtual network interface controllers. The four virtual machines may comprise four nodes of a virtual cluster.

The networked computing environment 100 may provide a cloud computing environment for one or more computing devices. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business related applications to a computing device, such as computing device 154. The computing device 154 may comprise a mobile computing device or a tablet computer. The storage appliance 140 may comprise a cloud-based data management system for backing up virtual machines and/or files within a virtualized infrastructure, such as virtual machines running on server 160 or files stored on server 160.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In some cases, the snapshot may capture the state of various virtual machine settings and the state of one or more virtual disks for the virtual machine. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations), incremental files associated with commonly restored virtual machine versions, and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine information, such as identifications of the virtual machines protected and the historical versions or time machine views for each of the virtual machines protected, and allows an end user to search, select, and control virtual machines managed by the storage appliance. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

Figure 1B:
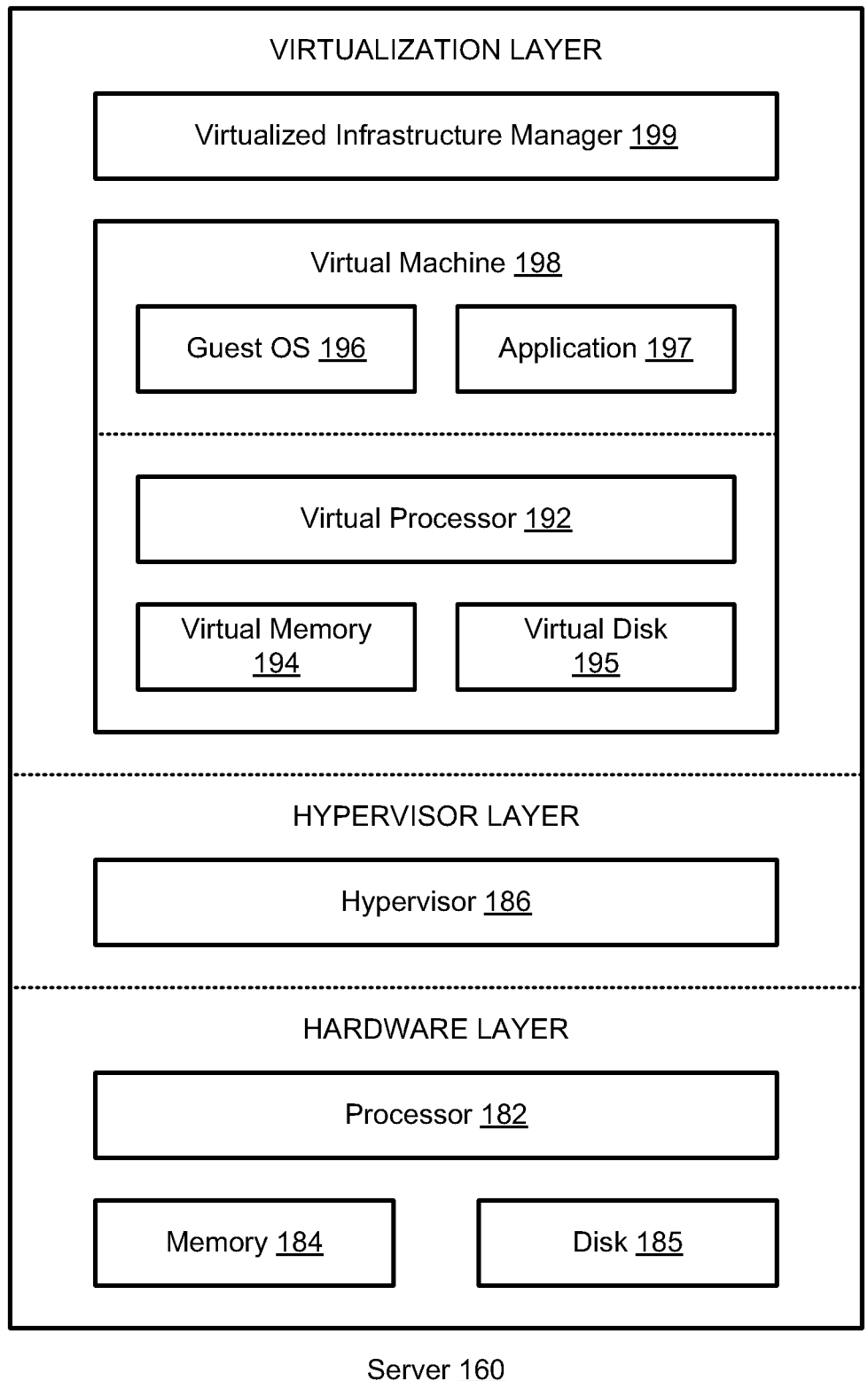
FIG. 1B depicts one embodiment of a server.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197. The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time (e.g., 6:30 p.m. on Jun. 29, 2017) and a second snapshot of the virtual machine may correspond with a second state of the virtual machine at a second point in time subsequent to the first point in time (e.g., 6:30 p.m. on Jun. 30, 2017).

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with changed blocks stored on a virtual disk of the virtual machine that have changed since the last snapshot of the virtual machine was taken. In one embodiment, the data management application may specify a first point in time and a second point in time and the virtualized infrastructure manager 199 may output one or more changed data blocks associated with the virtual machine that have been modified between the first point in time and the second point in time.

Figure 1C:
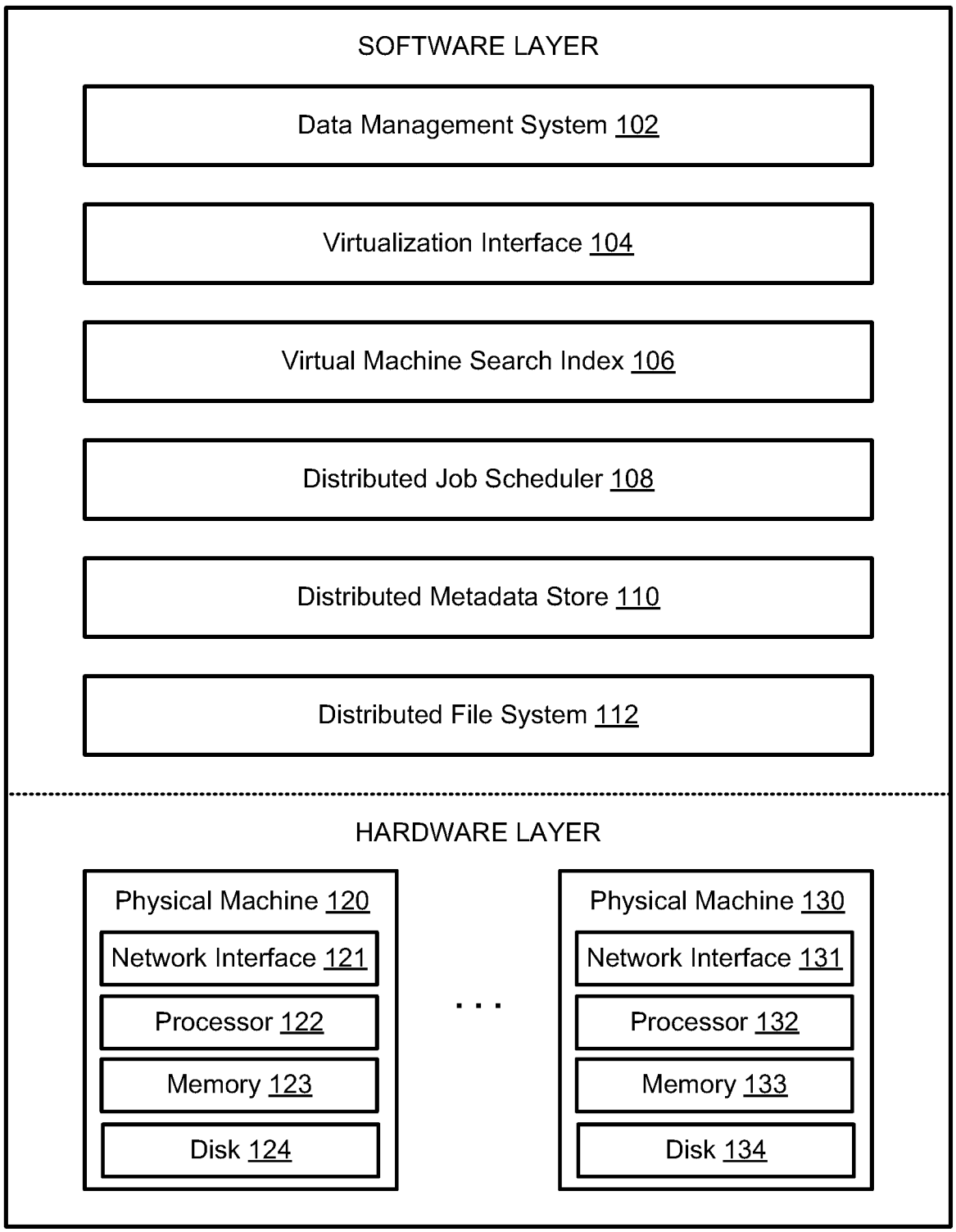
FIG. 1C depicts one embodiment of a storage appliance.

FIG. 1C depicts one embodiment of a storage appliance, such as storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snapshots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a full-image snapshot of a virtual machine (e.g., /snapshots/VM_A/s1/s1.full) may be replicated and stored on three of the ten machines. In some cases, the data chunks associated with a file stored in the distributed file system 112 may include replicated data (e.g., due to n-way mirroring) or parity data (e.g., due to erasure coding). When a disk storing one of the data chunks fails, then the distributed file system may regenerate the lost data and store the lost data using a new disk.

In one embodiment, the distributed file system 112 may be used to store a set of versioned files corresponding with a virtual machine. The set of versioned files may include a first file comprising a full image of the virtual machine at a first point in time and a second file comprising an incremental file relative to the full image. The set of versioned files may correspond with a snapshot chain for the virtual machine. The distributed file system 112 may determine a first set of data chunks that includes redundant information for the first file (e.g., via application of erasure code techniques) and store the first set of data chunks across a plurality of nodes within a cluster. The placement of the first set of data chunks may be determined based on the locations of other data related to the first set of data chunks (e.g., the locations of other chunks corresponding with the second file or other files within the snapshot chain for the virtual machine). In some embodiments, the distributed file system 112 may also co-locate data chunks or replicas of virtual machines discovered to be similar to each other in order to allow for cross virtual machine deduplication. In this case, the placement of the first set of data chunks may be determined based on the locations of other data corresponding with a different virtual machine that has been determined to be sufficiently similar to the virtual machine.

The distributed metadata store 110 may comprise a distributed database management system that provides high availability without a single point of failure. The distributed metadata store 110 may act as a quick-access database for various components in the software stack of the storage appliance 170 and may store metadata corresponding with stored snapshots using a SSD or a Flash-based storage device. In one embodiment, the distributed metadata store 110 may comprise a database, such as a distributed document oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals. In some cases, a first version of a virtual machine corresponding with a first snapshot of the virtual machine at a first point in time may be generated by concurrently reading a full image for the virtual machine corresponding with a state of the virtual machine prior to the first point in time from the first storage device while reading one or more incrementals from the second storage device different from the first storage device (e.g., reading the full image from a HDD at the same time as reading 64 incrementals from an SSD).

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster and each node may independently determine which tasks to execute. The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine).

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that includes the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

The data management system 102 may comprise an application running on the storage appliance that manages the capturing, storing, deduplication, compression (e.g., using a lossless data compression algorithm such as LZ4 or LZ77), and encryption (e.g., using a symmetric key algorithm such as Triple DES or AES-256) of data for the storage appliance 170. In one example, the data management system 102 may comprise a highest level layer in an integrated software stack running on the storage appliance. The integrated software stack may include the data management system 102, the virtualization interface 104, the distributed job scheduler 108, the distributed metadata store 110, and the distributed file system 112. In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

In some embodiments, a plurality of versions of a virtual machine may be stored as a base file associated with a complete image of the virtual machine at a particular point in time and one or more incremental files associated with forward and/or reverse incremental changes derived from the base file. The data management system 102 may patch together the base file and the one or more incremental files in order to generate a particular version of the plurality of versions by adding and/or subtracting data associated with the one or more incremental files from the base file or intermediary files derived from the base file. In some embodiments, each version of the plurality of versions of a virtual machine may correspond with a merged file. A merged file may include pointers or references to one or more files and/or one or more chunks associated with a particular version of a virtual machine. In one example, a merged file may include a first pointer or symbolic link to a base file and a second pointer or symbolic link to an incremental file associated with the particular version of the virtual machine. In some embodiments, the one or more incremental files may correspond with forward incrementals (e.g., positive deltas), reverse incrementals (e.g., negative deltas), or a combination of both forward incrementals and reverse incrementals.

Figure 1D:
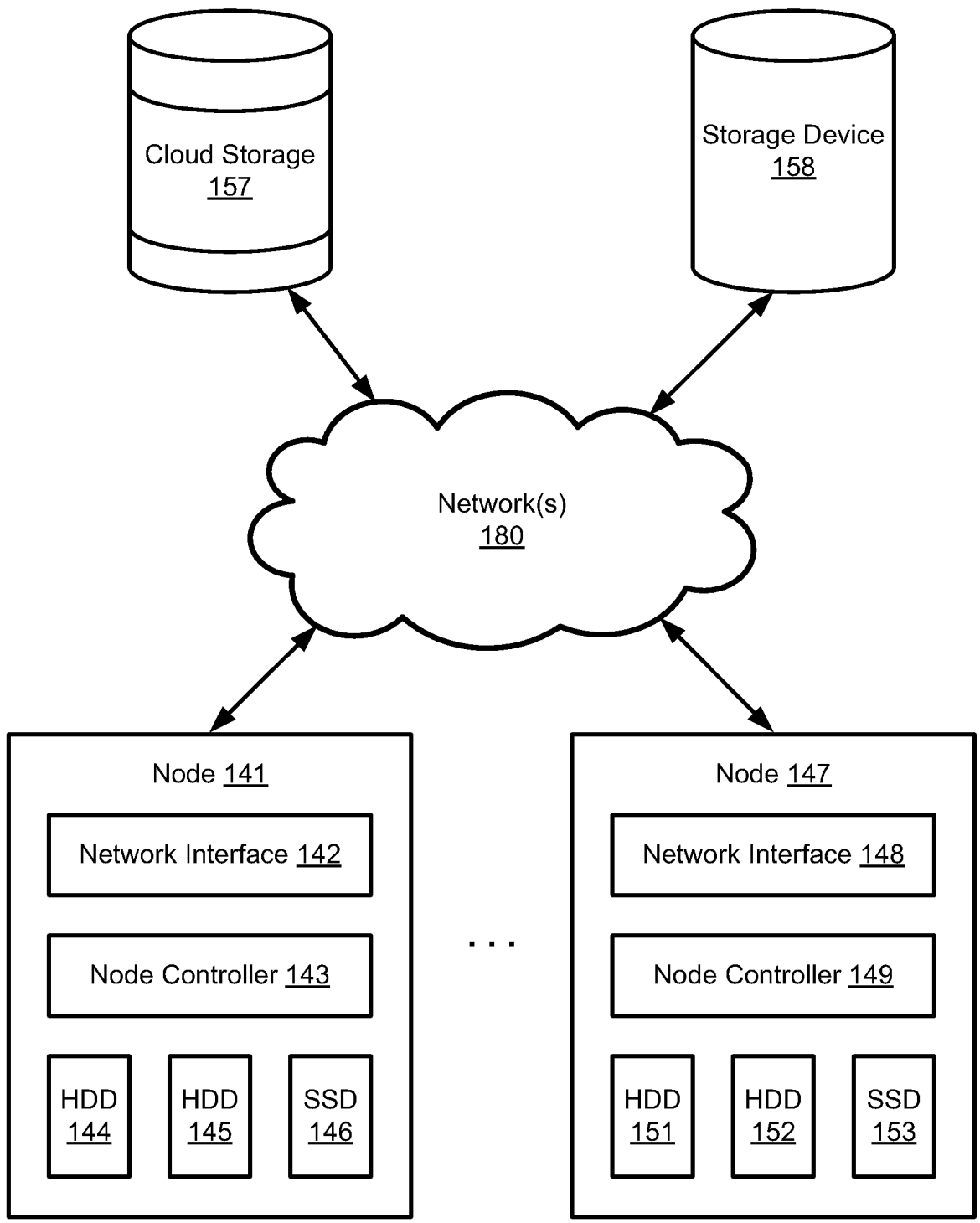
FIG. 1D depicts one embodiment of a portion of an integrated data management and storage system that includes a plurality of nodes in communication with each other and one or more storage devices.

FIG. 1D depicts one embodiment of a portion of an integrated data management and storage system that includes a plurality of nodes in communication with each other and one or more storage devices via one or more networks 180. The plurality of nodes may be networked together and present themselves as a unified storage system. The plurality of nodes includes node 141 and node 147. The one or more storage devices include storage device 157 and storage device 158. Storage device 157 may correspond with a cloud-based storage (e.g., private or public cloud storage). Storage device 158 may comprise a hard disk drive (HDD), a magnetic tape drive, a solid-state drive (SSD), a storage area network (SAN) storage device, or a networked-attached storage (NAS) device. The integrated data management and storage system may comprise a distributed cluster of storage appliances in which each of the storage appliances includes one or more nodes. In one embodiment, node 141 and node 147 may comprise two nodes housed within a first storage appliance, such as storage appliance 170 in FIG. 1C. In another embodiment, node 141 may comprise a first node housed within a first storage appliance and node 147 may comprise a second node housed within a second storage appliance different from the first storage appliance. The first storage appliance and the second storage appliance may be located within a data center, such as data center 150 in FIG. 1A, or located within different data centers.

As depicted, node 141 includes a network interface 142, a node controller 143, and a first plurality of storage devices including HDDs 144-145 and SSD 146. The first plurality of storage devices may comprise two or more different types of storage devices. The node controller 143 may comprise one or more processors configured to store, deduplicate, compress, and/or encrypt data stored within the first plurality of storage devices. Node 147 includes a network interface 148, a node controller 149, and a second plurality of storage devices including HDDs 151-152 and SSD 153. The second plurality of storage devices may comprise two or more different types of storage devices. The node controller 149 may comprise one or more processors configured to store, deduplicate, compress, and/or encrypt data stored within the second plurality of storage devices. In some cases, node 141 may correspond with physical machine 120 in FIG. 1C and node 147 may correspond with physical machine 130 in FIG. 1C.

Figures 2A, 2B, 2C:
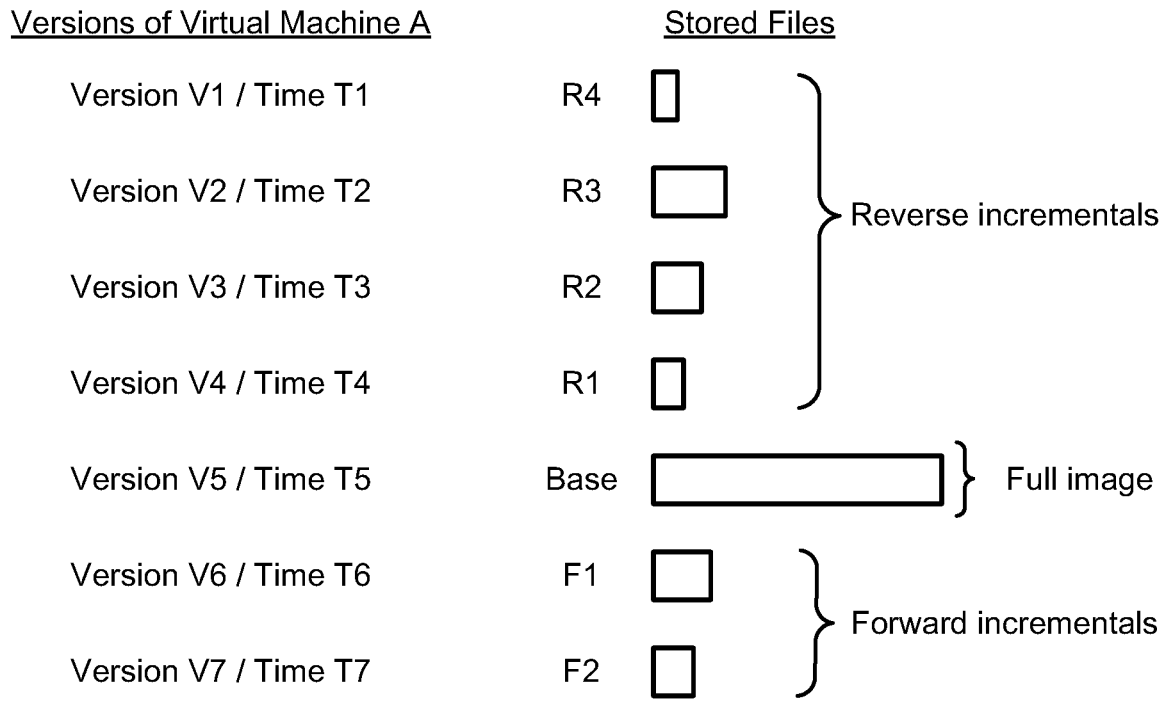
FIGS. 2A-2Q depict various embodiments of sets of files and data structures associated with managing and storing snapshots of virtual machines.
Figures 2D, 2E, 2F:
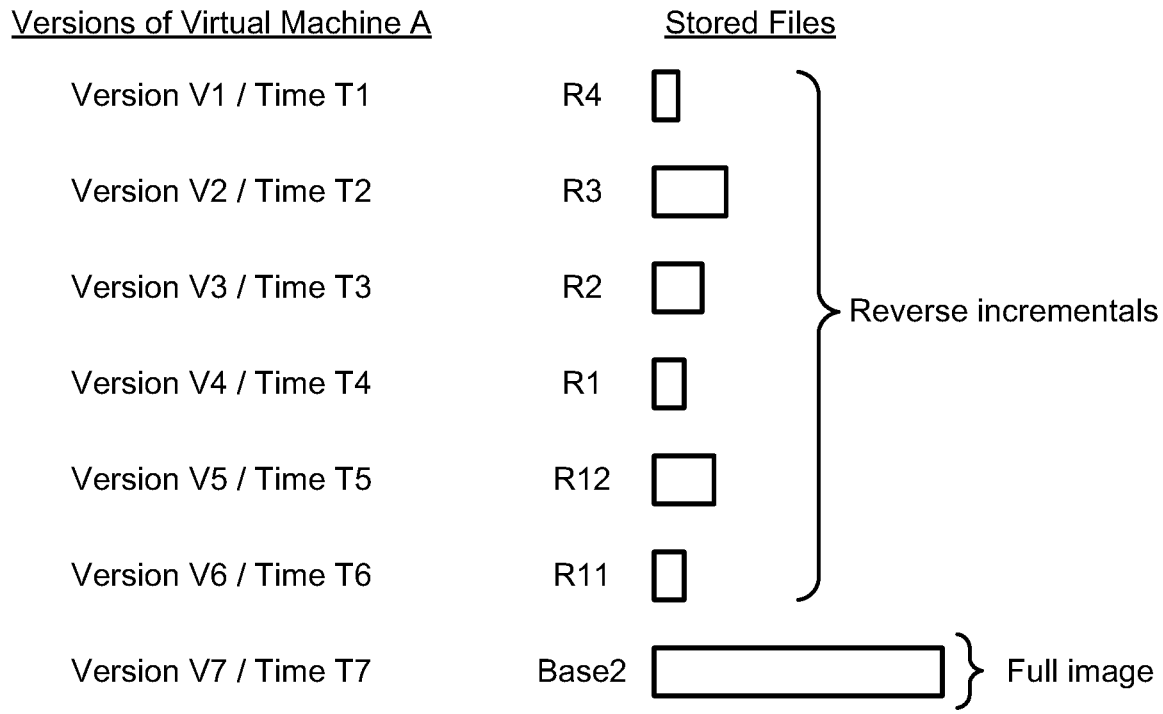
Figures 2G, 2H, 2I:
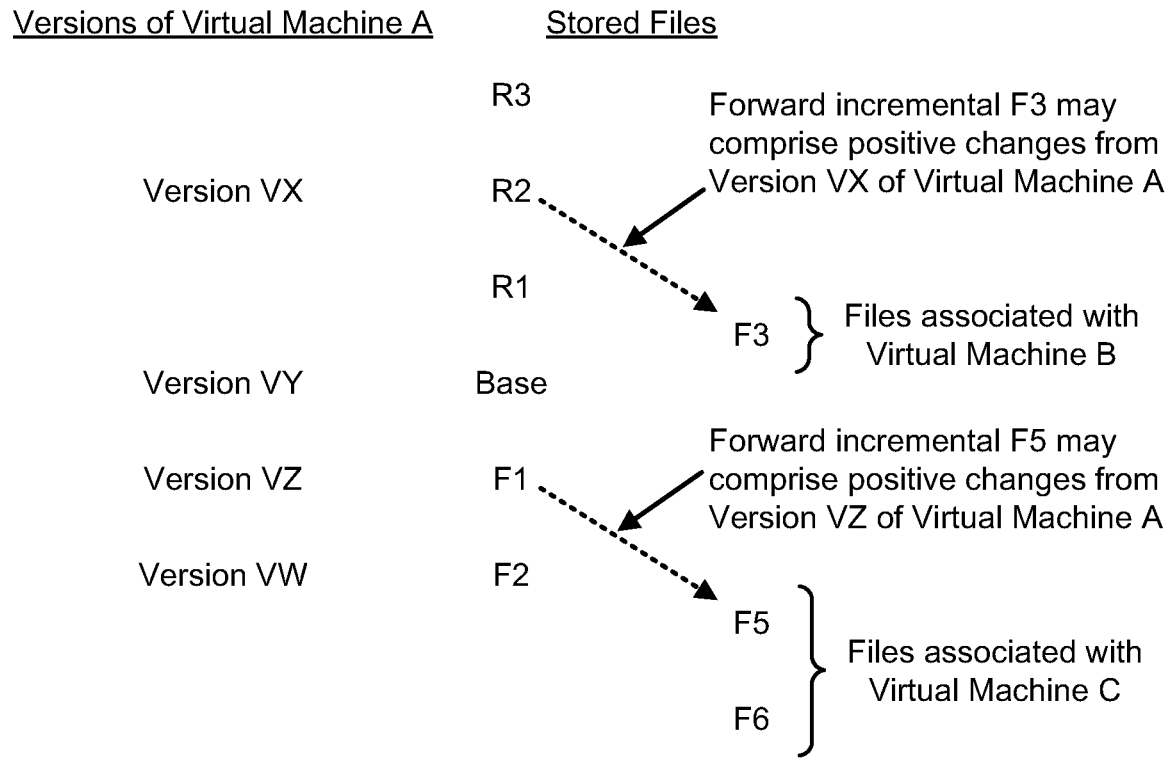
Figures 2J, 2K, 2L:
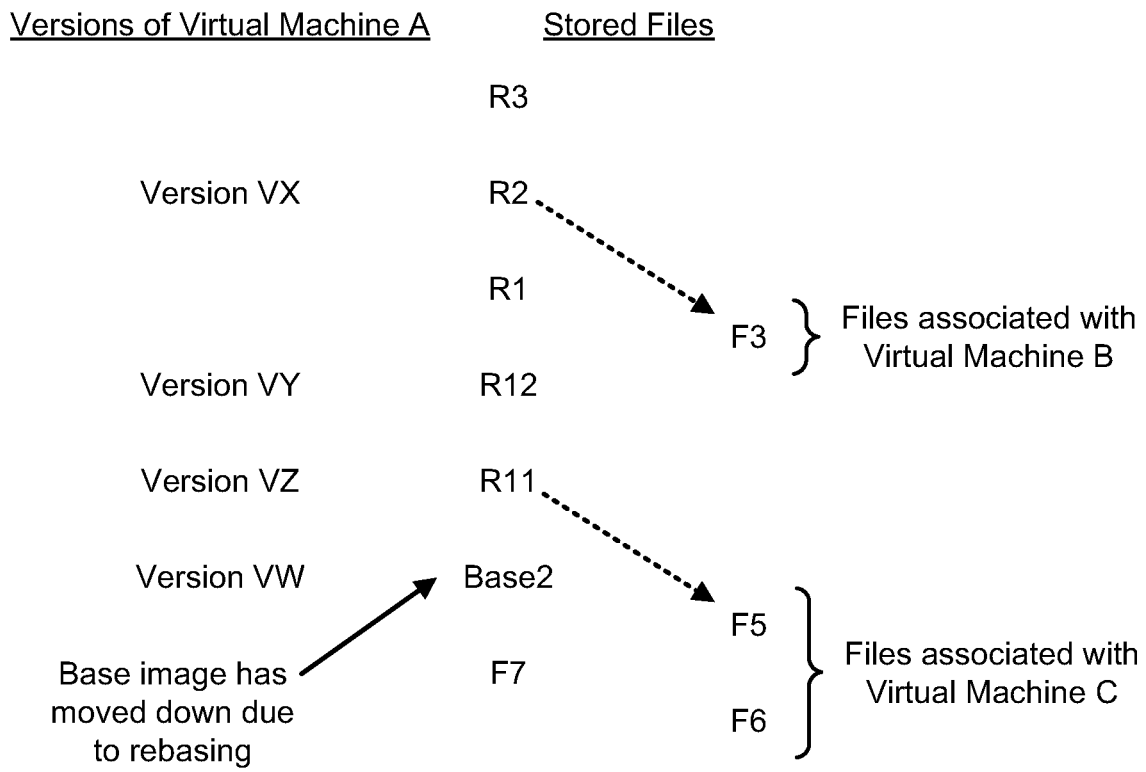
Figure 2M:
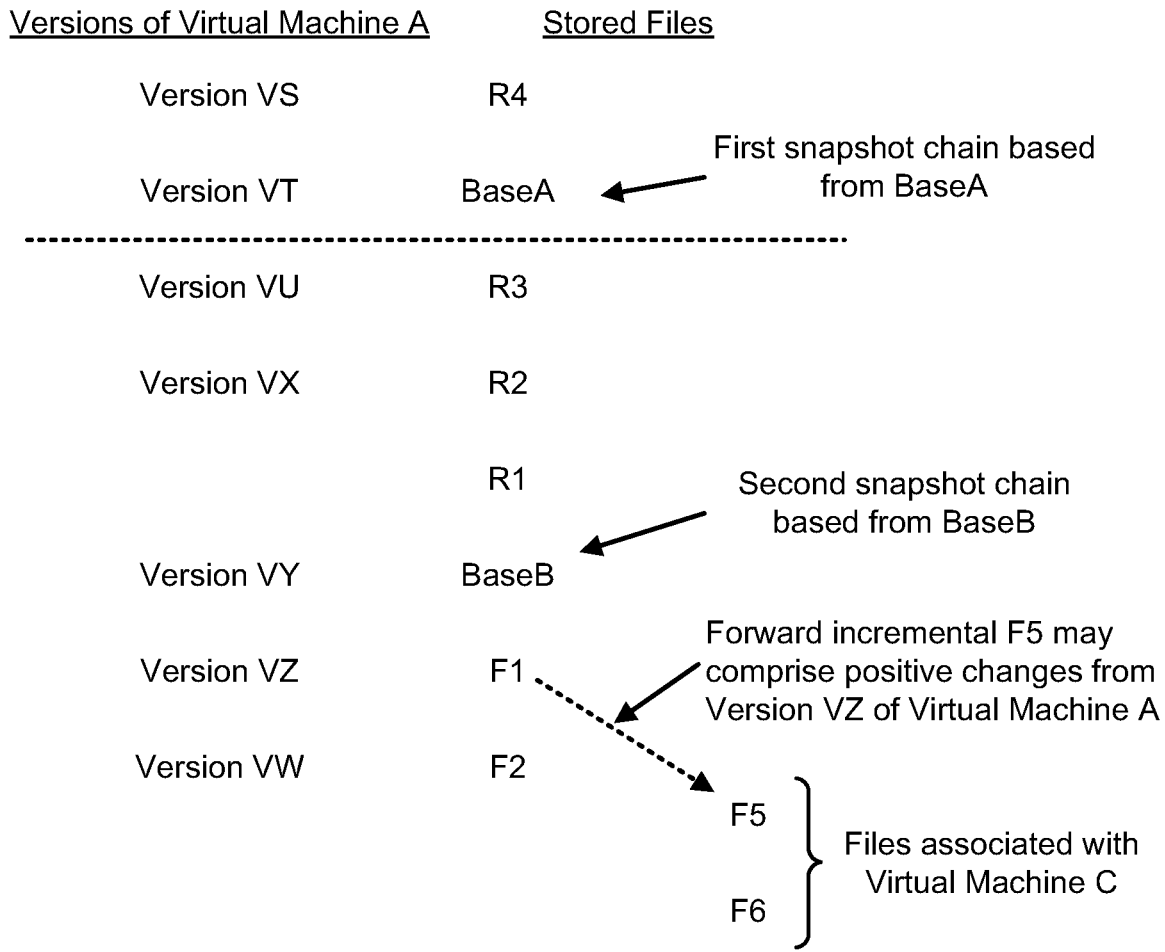
Figures 2P, 2Q:
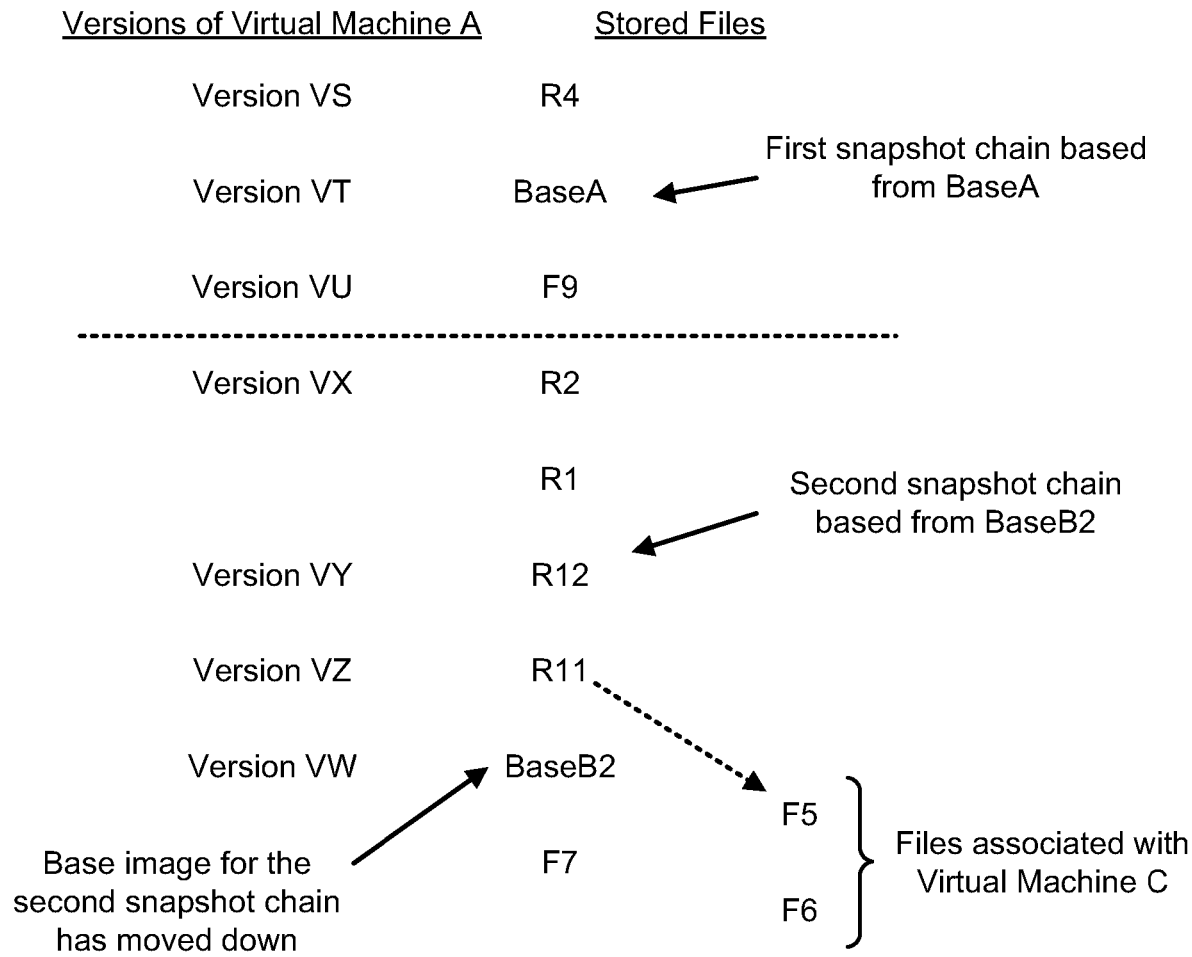

FIGS. 2A-2Q depict various embodiments of sets of files and data structures (e.g., implemented using merged files) associated with managing and storing snapshots of virtual machines.

FIG. 2A depicts one embodiment of a set of virtual machine snapshots stored as a first set of files. The first set of files may be stored using a distributed file system, such as distributed file system 112 in FIG. 1C. As depicted, the first set of files includes a set of reverse incrementals (R1-R4), a full image (Base), and a set of forward incrementals (F1-F2). The set of virtual machine snapshots includes different versions of a virtual machine (versions V1-V7 of Virtual Machine A) captured at different points in time (times T1-T7). In some cases, the file size of the reverse incremental R3 and the file size of the forward incremental F2 may both be less than the file size of the base image corresponding with version V5 of Virtual Machine A. The base image corresponding with version V5 of Virtual Machine A may comprise a full image of Virtual Machine A at point in time T5. The base image may include a virtual disk file for Virtual Machine A at point in time T5. The reverse incremental R3 corresponds with version V2 of Virtual Machine A and the forward incremental F2 corresponds with version V7 of Virtual Machine A. The forward incremental F1 may be associated with the data changes that occurred to Virtual Machine A between time T5 and time T6. The forward incremental F1 may include one or more changed data blocks.

In some embodiments, each snapshot of the set of virtual machine snapshots may be stored within a storage appliance, such as storage appliance 170 in FIG. 1A. In other embodiments, a first set of the set of virtual machine snapshots may be stored within a first storage appliance and a second set of the set of virtual machine snapshots may be stored within a second storage appliance, such as storage appliance 140 in FIG. 1A. In this case, a data management system may extend across both the first storage appliance and the second storage appliance. In one example, the first set of the set of virtual machine snapshots may be stored within a local cluster repository (e.g., recent snapshots of the file may be located within a first data center) and the second set of the set of virtual machine snapshots may be stored within a remote cluster repository (e.g., older snapshots or archived snapshots of the file may be located within a second data center) or a cloud repository.

FIG. 2B depicts one embodiment of a merged file for generating version V7 of Virtual Machine A using the first set of files depicted in FIG. 2A. The merged file includes a first pointer (pBase) that references the base image Base (e.g., via the path/snapshots/VM_A/s5/s5.full), a second pointer (pF1) that references the forward incremental F1 (e.g., via the path /snapshots/VM_A/s6/s6.delta), and a third pointer (pF2) that references the forward incremental F2 (e.g., via the path /snapshots/VM_A/s7/s7.delta). In one embodiment, to generate the full image of version V7 of Virtual Machine A, the base image may be acquired, the data changes associated with forward incremental F1 may be applied to (or patched to) the base image to generate an intermediate image, and then the data changes associated with forward incremental F2 may be applied to the intermediate image to generate the full image of version V7 of Virtual Machine A.

FIG. 2C depicts one embodiment of a merged file for generating version V2 of Virtual Machine A using the first set of files depicted in FIG. 2A. The merged file includes a first pointer (pBase) that references the base image Base (e.g., via the path/snapshots/VM_A/s5/s5.full), a second pointer (pR1) that references the reverse incremental R1 (e.g., via the path /snapshots/VM_A/s4/s4.delta), a third pointer (pR2) that references the reverse incremental R2 (e.g., via the path /snapshots/VM_A/s3/s3.delta), and a fourth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R1 may be applied to the base image to generate a first intermediate image, the data changes associated with reverse incremental R2 may be applied to the first intermediate image to generate a second intermediate image, and then the data changes associated with reverse incremental R3 may be applied to the second intermediate image to generate the full image of version V2 of Virtual Machine A.

FIG. 2D depicts one embodiment of a set of virtual machine snapshots stored as a second set of files after a rebasing process has been performed using the first set of files in FIG. 2A. The second set of files may be stored using a distributed file system, such as distributed file system 112 in FIG. 1C. The rebasing process may generate new files R12, R11, and Base2 associated with versions V5-V7 of Virtual Machine A in order to move a full image closer to a more recent version of Virtual Machine A and to improve the reconstruction time for the more recent versions of Virtual Machine A. The data associated with the full image Base in FIG. 2A may be equivalent to the new file R12 patched over R11 and the full image Base2. Similarly, the data associated with the full image Base2 may be equivalent to the forward incremental F2 in FIG. 2A patched over F1 and the full image Base in FIG. 2A.

The process of moving the full image snapshot for the set of virtual machine snapshots to correspond with the most recent snapshot version may be performed in order to shorten or reduce the chain lengths for the newest or most recent snapshots, which may comprise the snapshots of Virtual Machine A that are the most likely to be accessed. In some cases, a rebasing operation (e.g., that moves the full image snapshot for a set of virtual machine snapshots to correspond with the most recent snapshot version) or a reverse operation may be triggered when a number of forward incremental files is greater than a threshold number of forward incremental files for a snapshot chain (e.g., more than 200 forward incremental files). In other cases, a rebasing operation or a reverse operation may be triggered when the total disk size for the forward incremental files exceeds a threshold disk size (e.g., is greater than 200 GB) or is greater than a threshold percentage (e.g., is greater than 20%) of the base image for the snapshot chain.

In some cases, the rebasing process may be part of a periodic rebasing process that is applied at a rebasing frequency (e.g., every 24 hours) to each virtual machine of a plurality of protected virtual machines to reduce the number of forward incremental files that need to be patched to a base image in order to restore the most recent version of a virtual machine. Periodically reducing the number of forward incremental files may reduce the time to restore the most recent version of the virtual machine as the number of forward incremental files that need to be applied to a base image to generate the most recent version may be limited. In one example, if a rebasing process is applied to snapshots of a virtual machine every 24 hours and snapshots of the virtual machine are acquired every four hours, then the number of forward incremental files may be limited to at most five forward incremental files.

As depicted, the second set of files includes a set of reverse incrementals (R11-R12 and R1-R4) and a full image (Base2). The set of virtual machine snapshots includes the different versions of the virtual machine (versions V1-V7 of Virtual Machine A) captured at the different points in time (times T1-T7) depicted in FIG. 2A. In some cases, the file size of the reverse incremental R2 may be substantially less than the file size of the base image Base2. The reverse incremental R3 corresponds with version V2 of Virtual Machine A and the base image Base2 corresponds with version V7 of Virtual Machine A. In this case, the most recent version of Virtual Machine A (i.e., the most recent restore point for Virtual Machine A) comprises a full image. To generate earlier versions of Virtual Machine A, reverse incrementals may be applied to (or patched to) the full image Base2. Subsequent versions of Virtual Machine A may be stored as forward incrementals that depend from the full image Base2.

In one embodiment, a rebasing process may be applied to a first set of files associated with a virtual machine in order to generate a second set of files to replace the first set of files. The first set of files may include a first base image from which a first version of the virtual machine may be derived and a first forward incremental file from which a second version of the virtual machine may be derived. The second set of files may include a second reverse incremental file from which the first version of the virtual machine may be derived and a second base image from which the second version of the virtual machine may be derived. During the rebasing process, data integrity checking may be performed to detect and correct data errors in the files stored in a file system, such as distributed file system 112 in FIG. 1C, that are read to generate the second set of files.

FIG. 2E depicts one embodiment of a merged file for generating version V7 of Virtual Machine A using the second set of files depicted in FIG. 2D. The merged file includes a first pointer (pBase2) that references the base image Base2 (e.g., via the path/snapshots/VM_A/s7/s7.full). In this case, the full image of version V7 of Virtual Machine A may be directly acquired without patching forward incrementals or reverse incrementals to the base image Base2 corresponding with version V7 of Virtual Machine A.

FIG. 2F depicts one embodiment of a merged file for generating version V2 of Virtual Machine A using the second set of files depicted in FIG. 2D. The merged file includes a first pointer (pBase2) that references the base image Base2 (e.g., via the path/snapshots/VM_A/s7/s7.full), a second pointer (pR11) that references the reverse incremental R11 (e.g., via the path /snapshots/VM_A/s6/s6.delta), a third pointer (pR12) that references the reverse incremental R12 (e.g., via the path /snapshots/VM_A/s5/s5.delta), a fourth pointer (pR1) that references the reverse incremental R1 (e.g., via the path /snapshots/VM_A/s4/s4.delta), a fifth pointer (pR2) that references the reverse incremental R2 (e.g., via the path/snapshots/VM_A/s3/s3.delta), and a sixth pointer (pR3) that references the reverse incremental R3 (e.g., via the path /snapshots/VM_A/s2/s2.delta). In one embodiment, to generate the full image of version V2 of Virtual Machine A, the base image may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and then the data changes associated with reverse incremental R3 may be applied to the fourth intermediate image to generate the full image of version V2 of Virtual Machine A.

FIG. 2G depicts one embodiment of a set of files associated with multiple virtual machine snapshots. The set of files may be stored using a distributed file system, such as distributed file system 112 in FIG. 1C. As depicted, the set of files includes a set of reverse incrementals (R1-R3), a full image (Base), and a set of forward incrementals (F1-F2, F3, and F5-F6). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from Version VZ of Virtual Machine A.

In one embodiment, in response to a failure of a first virtual machine in a production environment (e.g., due to a failure of a physical machine running the first virtual machine), a most recent snapshot of the first virtual machine stored within a storage appliance, such as storage appliance 170 in FIG. 1C, may be mounted and made available to the production environment. In some cases, the storage appliance may allow the most recent snapshot of the first virtual machine to be mounted by a computing device within the production environment, such as server 160 in FIG. 1A. Once the most recent snapshot of the first virtual machine has been mounted, data stored within the most recent snapshot of the first virtual machine may be read and/or modified and new data may be written without the most recent snapshot of the first virtual machine being fully restored and transferred to the production environment. In some cases, a server within the production environment may boot up a failed virtual machine directly from a storage appliance, such as storage appliance 170 in FIG. 1C, acting as an NFS datastore to minimize the recovery time to recover the failed virtual machine.

FIG. 2H depicts one embodiment of a merged file for generating version V1 of Virtual Machine B using the set of files depicted in FIG. 2G. The merged file includes a first pointer (pBase) that references the base image Base, a second pointer (pR1) that references the reverse incremental R1, a third pointer (pR2) that references the reverse incremental R2, and a fourth pointer (pF3) that references the forward incremental F3. In one embodiment, to generate the full image of version V1 of Virtual Machine B, the base image associated with Version VY of Virtual Machine A may be acquired, the data changes associated with reverse incremental R1 may be applied to the base image to generate a first intermediate image, the data changes associated with reverse incremental R2 may be applied to the first intermediate image to generate a second intermediate image, and the data changes associated with forward incremental F3 may be applied to the second intermediate image to generate the full image of version V1 of Virtual Machine B.

FIG. 2I depicts one embodiment of a merged file for generating version V2 of Virtual Machine C using the set of files depicted in FIG. 2G. The merged file includes a first pointer (pBase) that references the base image Base, a second pointer (pF1) that references the forward incremental F1, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VY of Virtual Machine A) may be acquired, the data changes associated with forward incremental F1 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

FIG. 2J depicts one embodiment of a set of files associated with multiple virtual machine snapshots after a rebasing process has been performed using the set of files in FIG. 2G. The set of files may be stored using a distributed file system, such as distributed file system 112 in FIG. 1C. The rebasing process may generate new files R12, R11, and Base2. As depicted, the set of files includes a set of reverse incrementals (R11-R12 and R1-R3), a full image (Base2), and a set of forward incrementals (F3 and F5-F7). In this case, a first version of Virtual Machine B may be generated using a forward incremental F3 that derives from Version VX of Virtual Machine A and a second version of Virtual Machine C may be generated using forward incrementals F5-F6 that are derived from Version VZ of Virtual Machine A. In one example, Virtual Machine B may have been initially cloned from Version VX of Virtual Machine A and Virtual Machine C may have been initially cloned from version VZ of Virtual Machine A. Forward incremental file F7 may include changes to Version VW of Virtual Machine A that occurred subsequent to the generation of the full image file Base2. In some cases, the forward incremental file F7 may comprise a writeable file or have file permissions allowing modification of the file, while all other files associated with earlier versions of Virtual Machine A comprise read only files.

FIG. 2K depicts one embodiment of a merged file for generating version V1 of Virtual Machine B using the set of files depicted in FIG. 2J. The merged file includes a first pointer (pBase2) that references the base image Base2, a second pointer (pR11) that references the reverse incremental R11, a third pointer (pR12) that references the reverse incremental R12, a fourth pointer (pR1) that references the reverse incremental R1, a fifth pointer (pR2) that references the reverse incremental R2, and a sixth pointer (pF3) that references the forward incremental F3. In one embodiment, to generate the full image of version V1 of Virtual Machine B, a base image (e.g., the base image associated with Version VW of Virtual Machine A) may be acquired, the data changes associated with reverse incremental R11 may be applied to the base image to generate a first intermediate image, the data changes associated with reverse incremental R12 may be applied to the first intermediate image to generate a second intermediate image, the data changes associated with reverse incremental R1 may be applied to the second intermediate image to generate a third intermediate image, the data changes associated with reverse incremental R2 may be applied to the third intermediate image to generate a fourth intermediate image, and the data changes associated with forward incremental F3 may be applied to the fourth intermediate image to generate the full image of version V1 of Virtual Machine B.

FIG. 2L depicts one embodiment of a merged file for generating version V2 of Virtual Machine C using the set of files depicted in FIG. 2J. The merged file includes a first pointer (pBase2) that references the base image Base2, a second pointer (pR11) that references the reverse incremental R11, a third pointer (pF5) that references the forward incremental F5, and a fourth pointer (pF6) that references the forward incremental F6. In one embodiment, to generate the full image of version V2 of Virtual Machine C, a base image (e.g., the base image associated with Version VW of Virtual Machine A) may be acquired, the data changes associated with reverse incremental R11 may be applied to the base image to generate a first intermediate image, the data changes associated with forward incremental F5 may be applied to the first intermediate image to generate a second intermediate image, and the data changes associated with forward incremental F6 may be applied to the second intermediate image to generate the full image of version V2 of Virtual Machine C.

In some cases, a backed-up version of a first virtual machine may be generated by concurrently reading a full image of a second virtual machine different from the first virtual machine from a first storage device (e.g., a HDD) while reading one or more incrementals associated with the first virtual machine from a second storage device (e.g., an SSD) different from the first storage device.

FIG. 2M depicts one embodiment of a set of files associated with multiple virtual machine snapshots. The set of files may be stored using a distributed file system, such as distributed file system 112 in FIG. 1C. As depicted, the set of files includes a second full image (BaseB), a set of forward incrementals (F1-F2 and F5-F6) that derive from the second full image (BaseB), and a set of reverse incrementals (R1-R3) that derive from the second full image (BaseB). The set of files also includes a first full image (BaseA) and a reverse incremental (R4) that derives from the first full image (BaseA). In this case, the depicted snapshots for Virtual Machine A include two different full image snapshots (BaseA and BaseB). Each of the full image snapshots may comprise an anchor snapshot for a snapshot chain. The first full image (BaseA) and the reverse incremental (R4) may comprise a first snapshot chain with the first full image acting as the anchor snapshot. A second snapshot chain may comprise the second full image (BaseB), the set of forward incrementals (F1-F2), and the set of reverse incrementals (R1-R3). The first snapshot chain and the second snapshot chain may be independent of each other and independently managed. For example, the base image associated with the second snapshot chain for Virtual Machine A may be repositioned (e.g., via rebasing) without impacting the first snapshot chain for Virtual Machine A.

A third snapshot chain for Virtual Machine C may comprise the second full image (BaseB) and forward incrementals (F1 and F5-F6). The first snapshot chain for Virtual Machine A and the third snapshot chain for Virtual Machine C may be independent of each other and independently managed. However, as Virtual Machine C is a dependent virtual machine that depends from the second snapshot chain for Virtual Machine A, changes to the second snapshot chain may impact the third snapshot chain. For example, repositioning of the base image for the second snapshot chain due to rebasing may require the merged files for the third snapshot chain to be updated.

In some embodiments, each of the snapshot chains for Virtual Machine A may have a maximum incremental chain length (e.g., no more than 100 total incremental files), a maximum reverse incremental chain length (e.g., no more than 50 reverse incremental files), and a maximum forward incremental chain length (e.g., no more than 70 forward incremental files. In the event that a new snapshot will cause one of the snapshot chains to violate the maximum incremental chain length, the maximum reverse incremental chain length, or the maximum forward incremental chain length, then a new snapshot chain may be created for Virtual Machine A and a new full-image base file may be stored for the new snapshot chain.

FIG. 2N depicts one embodiment of a merged file for generating version VS of Virtual Machine A using the set of files depicted in FIG. 2M. The merged file includes a first pointer (pBaseA) that references the first base image BaseA and a second pointer (pR4) that references the reverse incremental R4. In one embodiment, to generate the full image of version VS of Virtual Machine A, the first base image associated with Version VT of Virtual Machine A may be acquired and the data changes associated with reverse incremental R4 may be applied to the first base image to generate the full image of version VS of Virtual Machine A.

FIG. 2O depicts one embodiment of a merged file for generating version VU of Virtual Machine A using the set of files depicted in FIG. 2M. The merged file includes a first pointer (pBaseB) that references the second base image BaseB, a second pointer (pR1) that references the reverse incremental R1, a third pointer (pR2) that references the reverse incremental R2, and a fourth pointer (pR3) that references the reverse incremental R3. In one embodiment, to generate the full image of version VU of Virtual Machine A, the second base image associated with Version VY of Virtual Machine A may be acquired, the data changes associated with reverse incremental R1 may be applied to the second base image to generate a first intermediate image, the data changes associated with reverse incremental R2 may be applied to the first intermediate image to generate a second intermediate image, and the data changes associated with reverse incremental R3 may be applied to the second intermediate image to generate the full image of version VU of Virtual Machine A.

FIG. 2P depicts one embodiment of a set of files associated with multiple virtual machine snapshots after a rebasing process has been performed to a snapshot chain using the set of files in FIG. 2M. The set of files may be stored using a distributed file system, such as distributed file system 112 in FIG. 1C. The rebasing process may generate new files R12, R11, and BaseB2. As depicted, the set of files includes a set of reverse incrementals (R11-R12 and R1-R2), a full image (BaseB2), and a set of forward incrementals (F5-F7). In this case, a second version of Virtual Machine C may be generated using forward incrementals F5-F6 that are derived from Version VZ of Virtual Machine A. Forward incremental file F7 may include changes to Version VW of Virtual Machine A that occurred subsequent to the generation of the full image file BaseB2. In some cases, the forward incremental file F7 may comprise a writeable file or have file permissions allowing modification of the file, while all other files associated with earlier versions of Virtual Machine A comprise read only files.

FIG. 2Q depicts one embodiment of a merged file for generating version VU of Virtual Machine A using the set of files depicted in FIG. 2P. The merged file includes a first pointer (pBaseA) that references the first base image BaseA and a second pointer (pF9) that references the forward incremental F9. In one embodiment, to generate the full image of version VU of Virtual Machine A, the first base image associated with Version VT of Virtual Machine A may be acquired and the data changes associated with forward incremental F9 may be applied to the first base image to generate the full image of version VU of Virtual Machine A.

In some embodiments, upon detection that a second snapshot chain has reached a maximum incremental chain length (e.g., no more than 500 total incremental files), a maximum reverse incremental chain length (e.g., no more than 400 reverse incremental files), or a maximum forward incremental chain length (e.g., no more than 150 forward incremental files), an existing snapshot chain (e.g., the first snapshot chain depicted in FIG. 2P) may have its chain length extended or snapshots previously assigned to the second snapshot chain may be moved to the existing snapshot chain. For example, the first snapshot chain depicted in FIG. 2M comprises two total snapshots, while the first snapshot chain depicted in FIG. 2P comprises three total snapshots as the snapshot corresponding with version VU of Virtual Machine A has moved from the second snapshot chain to the first snapshot chain.

In some embodiments, the number of snapshots in a snapshot chain may decrease over time as older versions of a virtual machine are consolidated, archived, deleted, or moved to a different storage domain (e.g., to cloud storage) depending on the data backup and archiving schedule for the virtual machine. In some cases, the maximum incremental chain length or the maximum number of snapshots for a snapshot chain may be increased over time as the versions stored by the snapshot chain age. In one example, if the versions of a virtual machine stored using a snapshot chain are all less than one month old, then the maximum incremental chain length may be set to a maximum of 200 incrementals; however, if the versions of the virtual machine stored using the snapshot chain are all greater than one month old, then the maximum incremental chain length may be set to a maximum of 1000 incrementals.

In some embodiments, the maximum incremental chain length for a snapshot chain may be increased over time as the number of allowed snapshots in a snapshot chain may be increased as the backed-up versions of a virtual machine get older. For example, the maximum incremental chain length for a snapshot chain storing versions of a virtual machine that are less than one year old may comprise a maximum incremental chain length of 200 incrementals, while the maximum incremental chain length for a snapshot chain storing versions of a virtual machine that are more than one year old may comprise a maximum incremental chain length of 500 incrementals.

In some embodiments, the maximum incremental chain length, the maximum reverse incremental chain length, or the maximum forward incremental chain length for a snapshot chain may be adjusted over time as nodes or disks are added to or removed from a cluster or upon an update to a data backup and archiving schedule for a virtual machine due to the assignment of a new backup class or a new backup, replication, and archival policy. In one example, the maximum incremental chain length may be increased from 200 incrementals to 500 incrementals if the number of nodes or disks falls below a threshold number (e.g., is less than four nodes). In another example, the maximum incremental chain length may be increased from 100 incrementals to 200 incrementals if the available disk storage falls below a threshold amount if disk space (e.g., the amount of available disk space is less than 20 TB).

Figure 3A:
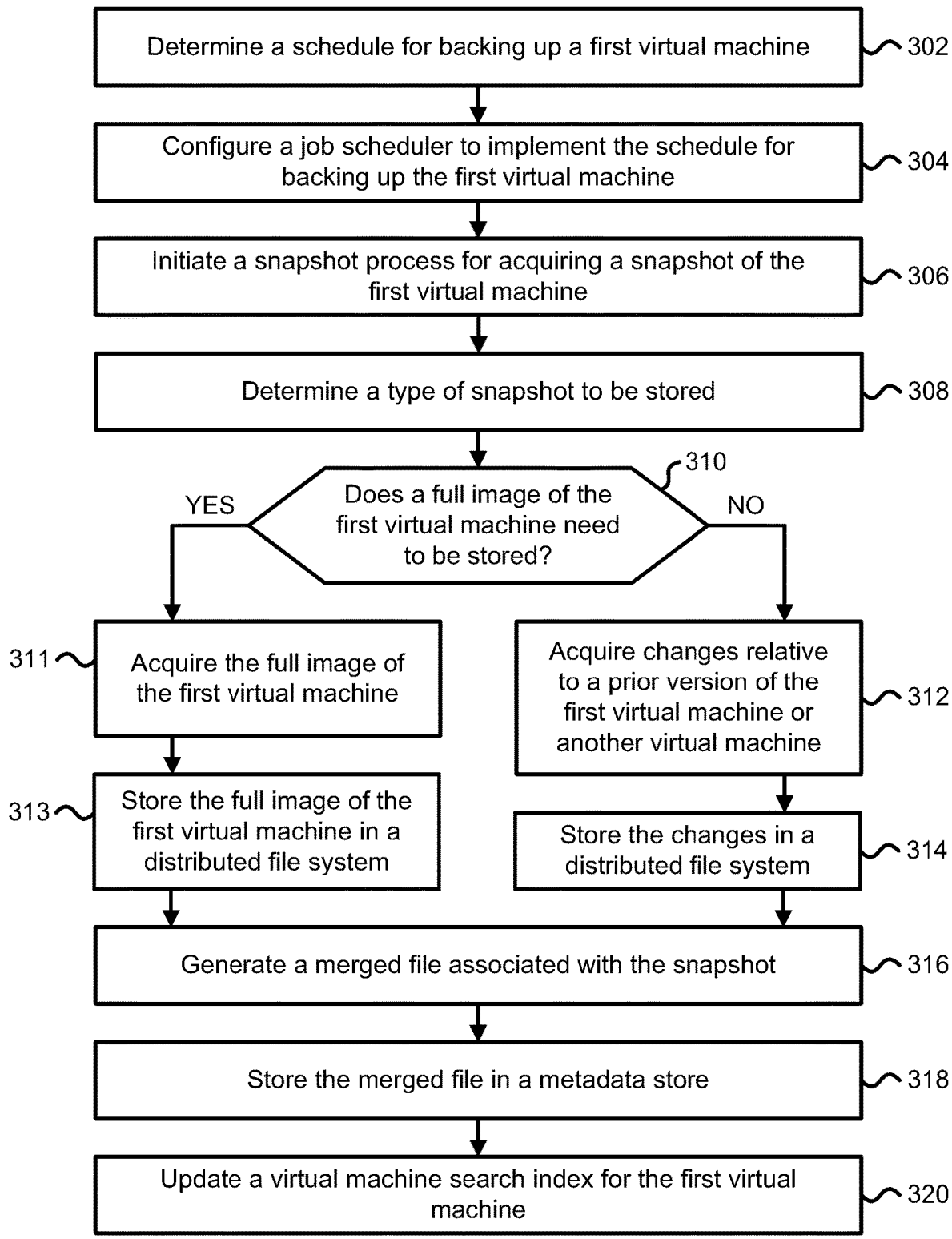
FIG. 3A is a flowchart describing one embodiment of a process for managing and storing virtual machine snapshots using a data storage system.

FIG. 3A is a flowchart describing one embodiment of a process for managing and storing virtual machine snapshots using a data storage system. In one embodiment, the process of FIG. 3A may be performed by a storage appliance, such as storage appliance 170 in FIG. 1A.

In step 302, a schedule for backing up a first virtual machine is determined. In one example, the schedule for backing up the first virtual machine may comprise periodically backing up the first virtual machine every four hours. The schedule for backing up the first virtual machine may be derived from a new backup, replication, and archival policy or backup class assigned to the first virtual machine. In step 304, a job scheduler is configured to implement the schedule for backing up the first virtual machine. In one example, a distributed job scheduler, such as distributed job scheduler 108 in FIG. 1C, may be configured to schedule and run processes for capturing and storing images of the first virtual machine over time according to the schedule. In step 306, a snapshot process for acquiring a snapshot of the first virtual machine is initiated. The snapshot process may send an instruction to a virtualized infrastructure manager, such as virtualization manager 169 in FIG. 1A, that requests data associated with the snapshot of the first virtual machine. In step 308, a type of snapshot to be stored is determined. The type of snapshot may comprise a full image snapshot or an incremental snapshot. In some cases, a full image snapshot may be captured and stored in order to serve as an anchor snapshot for a new snapshot chain. Versions of the first virtual machine may be stored using one or more independent snapshot chains, wherein each snapshot chain comprises a full image snapshot and one or more incremental snapshots. One embodiment of a process for determining the type of snapshot to be stored (e.g., storing either a full image snapshot or an incremental snapshot) is described later in reference to FIG. 3B.

In step 310, it is determined whether a full image of the first virtual machine needs to be stored in order to store the snapshot of the first virtual machine. The determination of whether a full image is required may depend on whether a previous full image associated with a prior version of the first virtual machine has been acquired. The determination of whether a full image is required may depend on the determination of the type of snapshot to be stored in step 308. If a full image needs to be stored, then step 311 is performed. Otherwise, if a full image does not need to be stored, then step 312 is performed. In step 311, the full image of the first virtual machine is acquired. The full image of the first virtual machine may correspond with a file or one or more data chunks. In step 312, changes relative to a prior version of the first virtual machine or relative to another virtual machine (e.g., in the case that the first virtual machine comprises a dependent virtual machine whose snapshots derive from a full image snapshot of a second virtual machine different from the first virtual machine) are acquired. The changes relative to the prior version of the first virtual machine or relative to a version of a different virtual machine may correspond with a file or one or more data chunks. In step 313, the full image of the first virtual machine is stored using a distributed file system, such as distributed file system 112 in FIG. 1C. In step 314, the changes relative to the prior version of the first virtual machine or relative to another virtual machine are stored using a distributed file system, such as distributed file system 112 in FIG. 1C. In one embodiment, the full image of the first virtual machine may be stored using a first storage device of a first type (e.g., a HDD) and the changes relative to the prior version of the first virtual machine may be stored using a second storage device of a second type (e.g., an SSD).

In some embodiments, snapshots of the first virtual machine may be ingested at a snapshot capture frequency (e.g., every 30 minutes) by a data storage system. When a snapshot of the first virtual machine is ingested, the snapshot may be compared with other snapshots stored within the data storage system in order to identify a candidate snapshot from which the snapshot may depend. In one example, a scalable approximate matching algorithm may be used to identify the candidate snapshot whose data most closely matches the data associated with the snapshot or to identify the candidate snapshot whose data has the fewest number of data differences with the snapshot. In another example, an approximate matching algorithm may be used to identify the candidate snapshot whose data within a first portion of the candidate snapshot most closely matches data associated with a first portion of the snapshot. In some cases, a majority of the data associated with the snapshot and the candidate snapshot may be identical (e.g., both the snapshot and the candidate snapshot may be associated with virtual machines that use the same operation system and have the same applications installed). Once the candidate snapshot has been identified, then data differences (or the delta) between the snapshot and the candidate snapshot may be determined and the snapshot may be stored based on the data differences. In one example, the snapshot may be stored using a forward incremental file that includes the data differences between the snapshot and the candidate snapshot. The forward incremental file may be compressed prior to being stored within a file system, such as distributed file system 112 in FIG. 1C.

In step 316, a merged file associated with the snapshot is generated. The merged file may reference one or more files or one or more data chunks that have been acquired in either step 311 or step 312. In one example, the merged file may comprise a file or a portion of a file that includes pointers to the one or more files or the one or more data chunks. In step 318, the merged file is stored in a metadata store, such as distributed metadata store 110 in FIG. 1C. In step 320, a virtual machine search index for the first virtual machine is updated. The virtual machine search index for the first virtual machine may include a list of files that have been stored in the first virtual machine and a version history for each of the files in the list. In one example, the virtual machine search index for the first virtual machine may be updated to include new files that have been added to the first virtual machine since a prior snapshot of the first virtual machine was taken and/or to include updated versions of files that were previously stored in the first virtual machine.

Figure 3B:
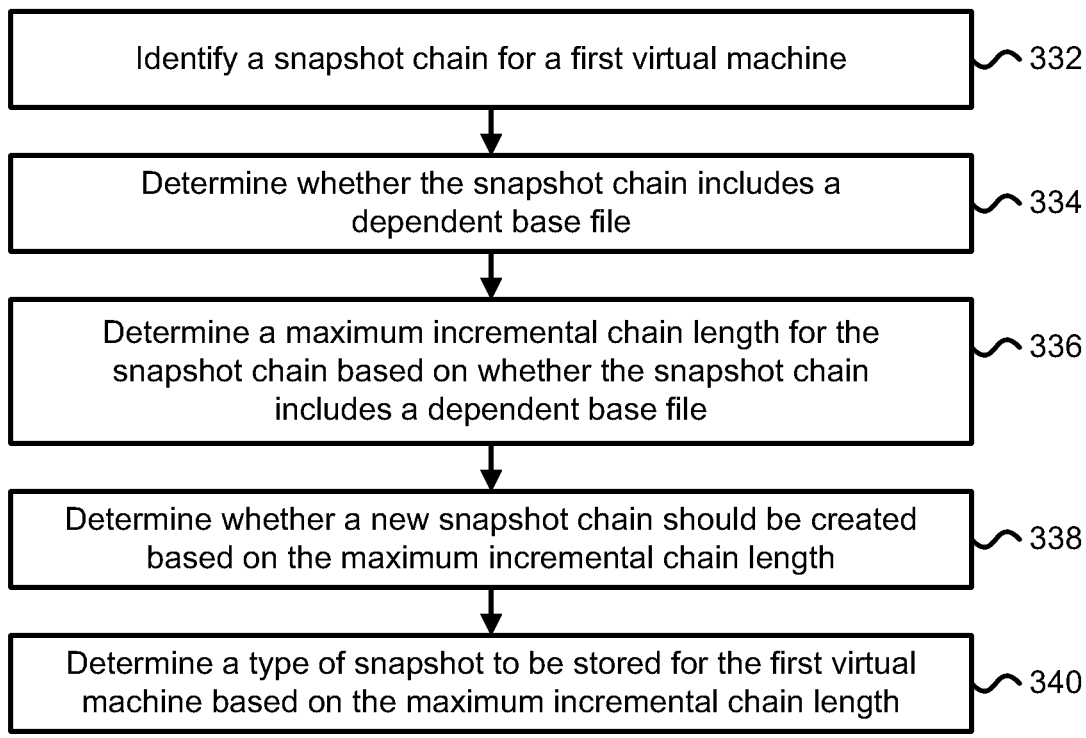
FIG. 3B is a flowchart describing one embodiment of a process for determining the type of snapshot to be stored using a data storage system.

FIG. 3B is a flowchart describing one embodiment of a process for determining the type of snapshot to be stored using a data storage system. The process described in FIG. 3B is one example of a process for implementing step 308 in FIG. 3A. In one embodiment, the process of FIG. 3B may be performed by a storage appliance, such as storage appliance 170 in FIG. 1A.

In step 332, a snapshot chain for a first virtual machine is identified. The snapshot chain may comprise a full image snapshot for the first virtual machine and one or more incremental snapshots that derive from the full image snapshot. Backed-up versions of the first virtual machine may correspond with one or more snapshot chains. Each of the one or more snapshot chains may include a full image snapshot or a base image from which incremental snapshots may derive. One example of backed-up versions of a virtual machine being stored using one or more snapshot chains is depicted in FIG. 2P in which the versions of Virtual Machine A are stored using a first snapshot chain anchored by full image BaseA and a second snapshot chain anchored by full image BaseB2.

In step 334, it is determined whether the snapshot chain includes a dependent base file. In this case, the first virtual machine may comprise a dependent virtual machine that has snapshots that derive from a full image snapshot of a different virtual machine. In one embodiment, the first virtual machine and the different virtual machine from which the first virtual machine depends may each have different virtual machine configuration files for storing configuration settings for the virtual machines. In one example, the first virtual machine may have a first number of virtual processors (e.g., two processors) and the different virtual machine may have a second number of virtual processors different from the first number of virtual processors (e.g., four processors). In another example, the first virtual machine may have a first virtual memory size (e.g., 1 GB) and the different virtual machine may have a second virtual memory size different from the first virtual memory size (e.g., 2 GB). In another example, the first virtual machine may run a first guest operating system and the different virtual machine may run a second guest operating system different from the first guest operating system.

In step 336, a maximum incremental chain length for the snapshot chain is determined based on whether the snapshot chain includes a dependent base file. In one example, if the first virtual machine comprises a dependent virtual machine, then the maximum incremental chain length may be set to a maximum length of 200 snapshots; however if the first virtual machine is independent and is not a dependent virtual machine, then the maximum incremental chain length may be set to a maximum length of 500 snapshots.

In one embodiment, the maximum incremental chain length for the snapshot chain may be determined based on an age of the backed-up versions within the snapshot chain. In one example, the maximum incremental chain length for a snapshot chain storing versions of the first virtual machine that are less than one year old may comprise a maximum incremental chain length of 100 incrementals, while the maximum incremental chain length for a snapshot chain storing versions of the first virtual machine that are more than one year old may comprise a maximum incremental chain length of 200 incrementals.

In step 338, it is determined whether a new snapshot chain should be created based on the maximum incremental chain length. In step 340, a type of snapshot to be stored for the first virtual machine is determined based on the maximum incremental chain length. The type of snapshot may comprise either a full image snapshot or an incremental snapshot. In one embodiment, if the snapshot chain for the first virtual machine exceeds the maximum incremental chain length for the snapshot chain, then the type of snapshot to be stored for the first virtual machine may comprise a full image snapshot. In this case, an additional snapshot chain may be created for the first virtual machine.

Figure 3C:
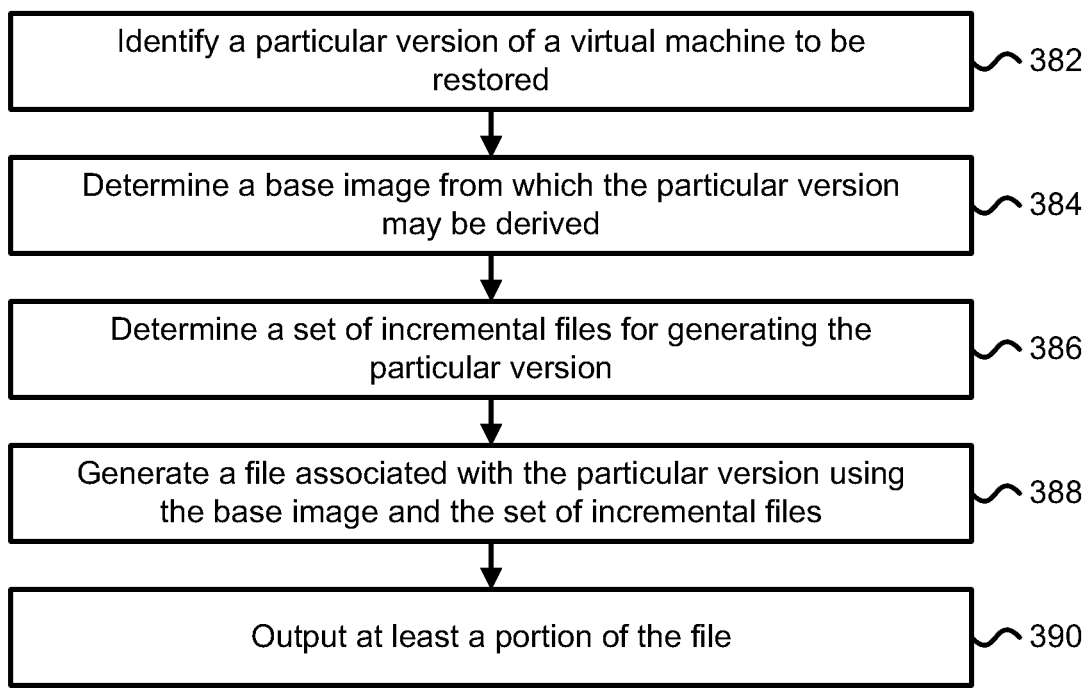
FIG. 3C is a flowchart describing one embodiment of a process for restoring a version of a virtual machine using a data storage system.

FIG. 3C is a flowchart describing one embodiment of a process for restoring a version of a virtual machine using a data storage system. In one embodiment, the process of FIG. 3C may be performed by a storage appliance, such as storage appliance 170 in FIG. 1A.

In step 382, a particular version of a virtual machine to be restored is identified. In step 384, a base image from which the particular version may be derived is determined. In step 386, a set of incremental files for generating the particular version is determined. In one embodiment, the base image and the set of incremental files may be determined from a merged file associated with the particular version of the virtual machine. In some cases, the set of incremental files may include one or more forward incremental files and one or more reverse incremental files. In step 388, a file associated with the particular version is generated using the base image and the set of incremental files. The file may be generated by patching the set of incremental files onto the base image.

In one example, referring to FIG. 2G, if the particular version corresponds with Version V2 of Virtual Machine C, then the base image may correspond with the file Base in FIG. 2G and the set of incremental files may correspond with files F1, F5, and F6 of FIG. 2G. In another example, referring to FIG. 2G, if the particular version corresponds with Version V1 of Virtual Machine B, then the base image may correspond with the file Base in FIG. 2G and the set of incremental files may correspond with files R1, R2, and F3 of FIG. 2G. In step 390, at least a portion of the file is outputted. The at least a portion of the file may be electronically transferred to a computing device, such as computing device 154 in FIG. 1A, or to a virtualization manager, such as virtualization manager 169 in FIG. 1A.

In some embodiments, the base image and a subset of the set of incremental files may correspond with a second virtual machine different from the virtual machine. In this case, the base image may comprise the base image for the second virtual machine and the set of incremental files may include a dependent base file that comprises data differences between the base image for the second virtual machine and a previously acquired base image for the virtual machine. Data deduplication techniques may be applied to identify a candidate base image from which a dependent base file may depend and to generate the dependent base file.

FIG. 3D depicts one embodiment of a virtual machine search index, such as virtual machine search index 106 in FIG. 1C. A virtual machine search index for a virtual machine may include a list, table, or other data structure that stores mappings or pointers from different versions of files stored on the virtual machine to different versions of the virtual machine. As depicted, the virtual machine search index includes a list of file versions for File X that are stored on Virtual Machine A. The list of file versions for File X includes Versions X1-X4. Each of the file versions includes a pointer to a particular version of Virtual Machine A that corresponds with the earliest point in time snapshot of Virtual Machine A that includes the file version. For example, version A23 of Virtual Machine A comprises the earliest point in time snapshot of Virtual Machine A that includes version X1 of File X and version A45 of Virtual Machine A comprises the earliest point in time snapshot of Virtual Machine A that includes version X2 of File X. The virtual machine search index also includes a list of file versions for File Y that are stored on Virtual Machine A. The list of file versions for File Y includes a mapping of version Y1 of File Y (saved at time T2) to version A45 of Virtual Machine A and a mapping of version Y2 of File Y (saved at time T8 subsequent to time T2) to version A95 of Virtual Machine A. Version A45 of Virtual Machine A may comprise the 45$^{th}$ version of Virtual Machine A.

FIG. 3E depicts one embodiment of a merged file for the version A45 of Virtual Machine A referred to in FIG. 3D. The merged file includes a first pointer (pBase) that references a base image (e.g., via the path /snapshots/V_A/s100/s100.full) and other pointers to reverse incremental files (e.g., a pointer to reverse incremental file R55 via the path/snapshots/VM_A/s45/s45.delta). In this case, version A45 of Virtual Machine A may be generated by patching 55 reverse incremental files onto the base image. However, rather than patching the reverse incremental files onto the entire base image, only a portion of the base image associated with a file to be restored (e.g., version X2 of File X) may be acquired from a file system and patched.

FIG. 3F depicts one embodiment of a first portion 362 of the base image referenced by the first pointer (pBase) in FIG. 3E and a second portion 364 of the base image referenced by the first pointer (pBase) in FIG. 3E. In some cases, rather than restoring an entire base image in order to restore a particular version of a file, the first portion 362 of the base image may be restored in order to identify a location of the file within the base image or to identify one or more regions within the base image that store the file. In one example, the first portion 362 of the base image may correspond with one or more file system metadata files. The one or more file system metadata files may store information regarding the type of file system used and information regarding every file and directory on a virtual volume or disk. In some cases, the one or more file system metadata files may be located near the beginning or the end of the base image or near the beginning or the end of a virtual disk partition within the base image. The one or more file system metadata files may include NTFS metadata files, such as an NTFS Master File Table. The NTFS Master File Table may include information for retrieving files from an NTFS partition. The one or more file system metadata files may include a File Allocation Table. The one or more file system metadata files may include information for locating and retrieving files from a virtual disk within the base image (even if due to fragmentation, a file is located in multiple regions within the virtual disk).

Once the first portion 362 of the base image has been acquired and one or more regions within the base image are identified that store the file to be restored, the one or more regions of the base image including the second portion 364 of the base image may be read and patched with data from one or more reverse incremental files in order to generate a portion of a particular version of a virtual machine from which the particular version of the file may be extracted. Thus, a particular version of a file may be quickly extracted by using the virtual machine search index of FIG. 3D to identify a version of a virtual machine that includes the particular version of the file and then restoring only a portion of the version of the virtual machine that includes the particular version of the file. One benefit of extracting the particular version of the file from a small portion of the version of the virtual machine (e.g., 2 MB) rather than from an entire image of the version of the virtual machine (e.g., 20 GB) is that the particular version of the file may be restored in a shorter amount of time.

Figure 3G:
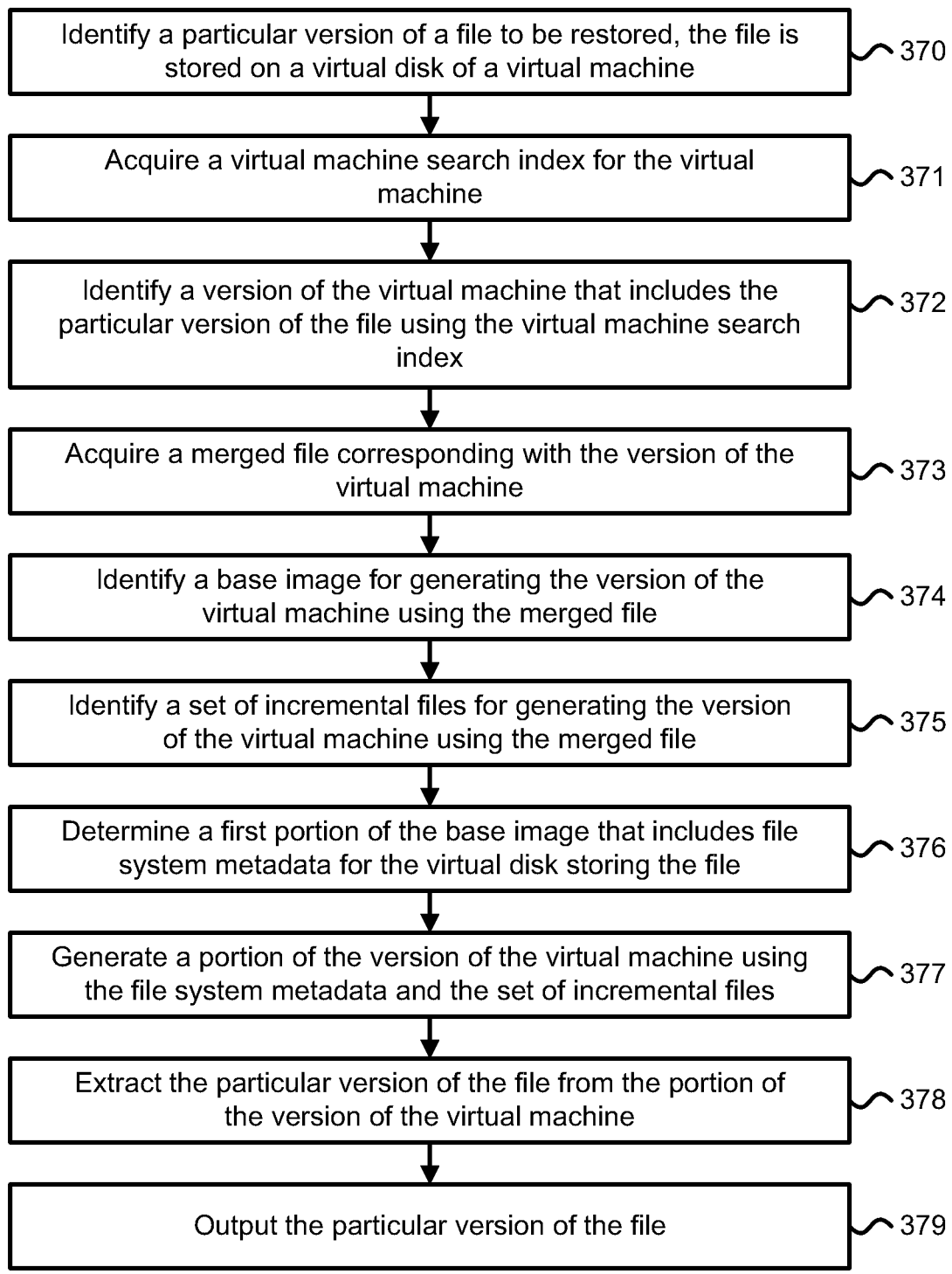
FIG. 3G is a flowchart describing one embodiment of a process for extracting a particular version of a file from one or more snapshots of a virtual machine.

FIG. 3G is a flowchart describing one embodiment of a process for extracting a particular version of a file from one or more snapshots of a virtual machine. In one embodiment, the process of FIG. 3G may be performed by a storage appliance, such as storage appliance 170 in FIG. 1A.

In step 370, a particular version of a file to be restored is identified. The file may be stored on a virtual disk of a virtual machine. The file may comprise or correspond with a database, a spreadsheet, a word processing document, an image file, a video file, a text file, an executable file, an audio file, an electronic message, or an email. The particular version of the file may be selected by an end user of a storage appliance, such as storage appliance 170 in FIG. 1A, using a user interface provided by the storage appliance. In step 371, a virtual machine search index, such as virtual machine search index 106 in FIG. 1C, for the virtual machine is acquired. In step 372, a version of the virtual machine that includes the particular version of the file is identified using the virtual machine search index. In step 373, a merged file corresponding with the version of the virtual machine is acquired. In step 374, a base image for generating the version of the virtual machine is identified using the merged file. In step 375, a set of incremental files for generating the version of the virtual machine is identified using the merged file. In step 376, a first portion of the base image that includes file system metadata for the virtual disk storing the file is determined. In one embodiment, the file system metadata may include information for location and retrieving the file from the virtual disk. In one example, the file system metadata includes NTFS metadata.

In step 377, a portion of the version of the virtual machine is generated using the file system metadata and the set of incremental files. In one embodiment, the portion of the version of the virtual machine is generated by patching the set of incremental files to a second portion of the base image, such as the second portion 364 of the base image in FIG. 3F.

In another embodiment, the portion of the version of the virtual machine is generated by applying portions of each of the set of incremental files to one or more data chunks located within the base image less than all of the data chunks within the base image. In step 378, the particular version of the file is extracted from the portion of the version of the virtual machine. In step 379, the particular version of the file is outputted. The particular version of the file may be transferred to a computing device, such as computing device 154 in FIG. 1A, or to a virtualization manager, such as virtualization manager 169 in FIG. 1A. In one example, the outputted file may correspond with a database that has been restored to a particular version of the database without having to perform a full restoration of an entire image of a virtual machine.

In some embodiments, a particular version of a data object to be restored may be identified. The particular version of the data object may correspond with a particular point in time instance of the data object (e.g., a third snapshot of an electronic document captured at a third point in time). The data object may be stored on a virtual disk of a virtual machine. The data object may comprise a database, a spreadsheet, a word processing document, an electronic document, an image, a video, a text file, an executable file, an audio recording, an electronic message, or an email. A version of the virtual machine that includes the particular version of the data object may be identified using a virtual machine search index. Once the version of the virtual machine has been identified, metadata associated with the virtual machine (e.g., file system metadata) may be read in order to identify one or more regions within the virtual disk that store the data object. A portion of the version of the virtual machine may then be generated by reading and/or patching only the one or more regions within the virtual disk that store the data object. The particular version of the data object may then be extracted using only the portion of the version of the virtual machine without having to extract or restore an entire image of the version of the virtual machine.

Figure 4A:
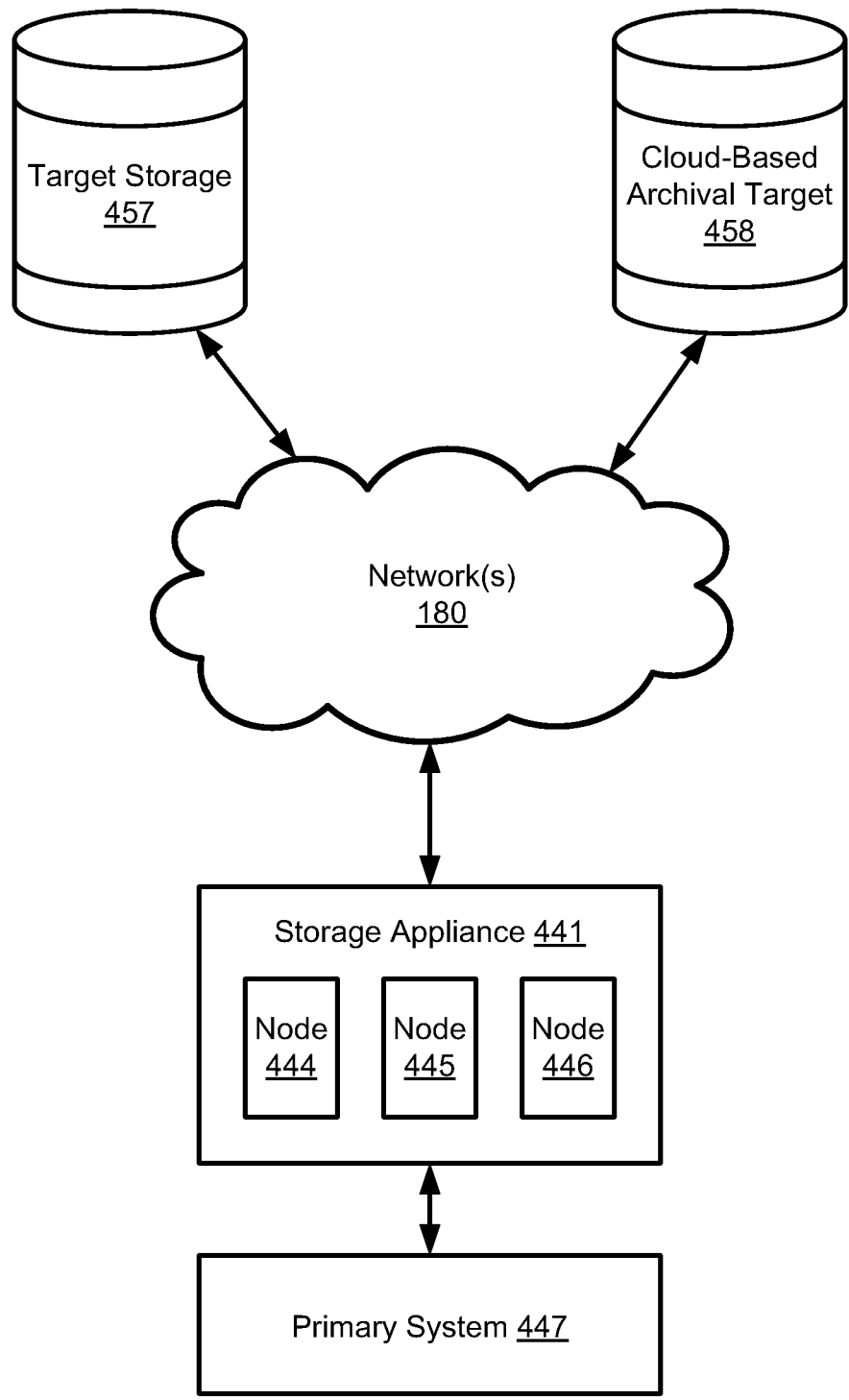
FIG. 4A depicts one embodiment of a portion of an integrated data management and storage system that includes a storage appliance in communication with one or more archival data stores.

FIG. 4A depicts one embodiment of a portion of an integrated data management and storage system that includes a storage appliance 441, such as storage appliance 170 in FIG. 1A, in communication with one or more archival data stores via one or more networks 180. The storage appliance 441 includes a cluster of data storage nodes that are networked together and present themselves as a unified data storage system. The cluster of data storage nodes includes nodes 444-446. In one example, node 444 may correspond with node 141 in FIG. 1D. In some cases, the storage appliance 441 may comprise a hardware storage appliance. In other cases, the storage appliance 441 may comprise a virtual storage appliance that includes virtual data storage nodes. The one or more archival data stores include target storage 457, which may comprise a storage area network storage device, a networked-attached storage device, a hard disk drive, or a solid-state drive. The one or more archival data stores also include cloud-based archival target 458, which may comprise public or private cloud-based data storage. The storage appliance 441 may protect or back-up different versions of virtual machines and/or real machines running within a primary system, such as primary system 447. The storage appliance 441 may acquire snapshots of the different versions of the virtual machines and/or real machines over time and store the snapshots using the cluster of data storage nodes. After the snapshots have been stored for an archival threshold period of time, the aged snapshots may be uploaded to the target storage 457 and/or the cloud-based archival target 458. In one example, snapshots that are more than one week old may be archived to the target storage 457 and/or the cloud-based archival target 458.

Figure 4B:
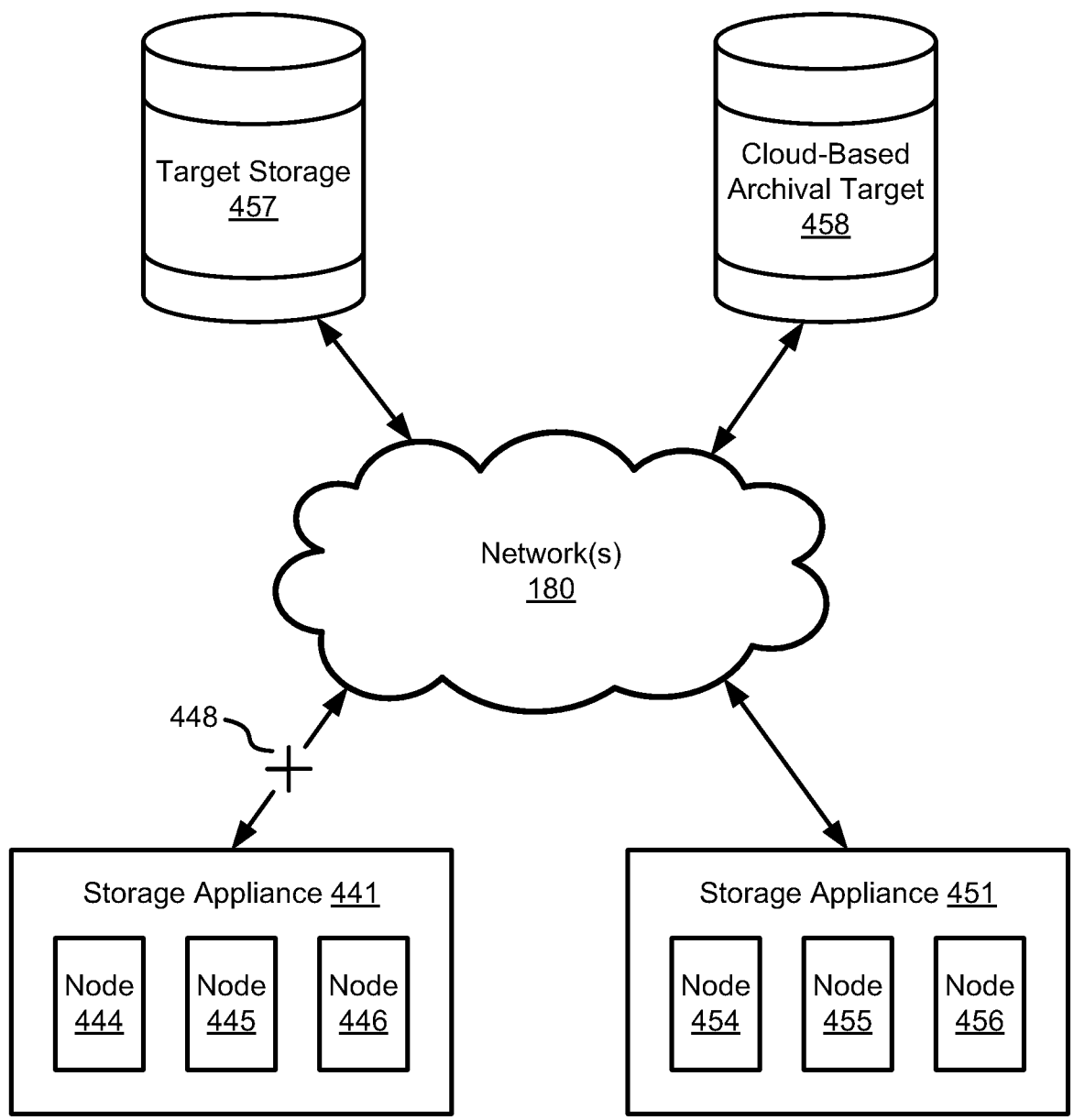
FIG. 4B depicts one embodiment of the portion of the integrated data management and storage system of FIG. 4A in which a storage appliance or a networking connection to the storage appliance has failed permanently or temporarily.

FIG. 4B depicts one embodiment of the portion of the integrated data management and storage system of FIG. 4A in which the storage appliance 441 or a networking connection 448 to the storage appliance 441 has failed permanently or temporarily. In one example, a natural disaster (e.g., an earthquake) or a data center fire may cause the storage appliance 441 to fail or to be unable to transfer archived snapshot data to the one or more archival data stores. In this case, a second storage appliance 451 that includes data storage nodes 454-456 may connect to the one or more archival data stores and acquire a snapshot mapping file for a particular snapshot (e.g., for a particular point in time version of a virtual disk) and acquire or download a plurality of data blocks for the particular snapshot using the snapshot mapping file.

Figure 4C:
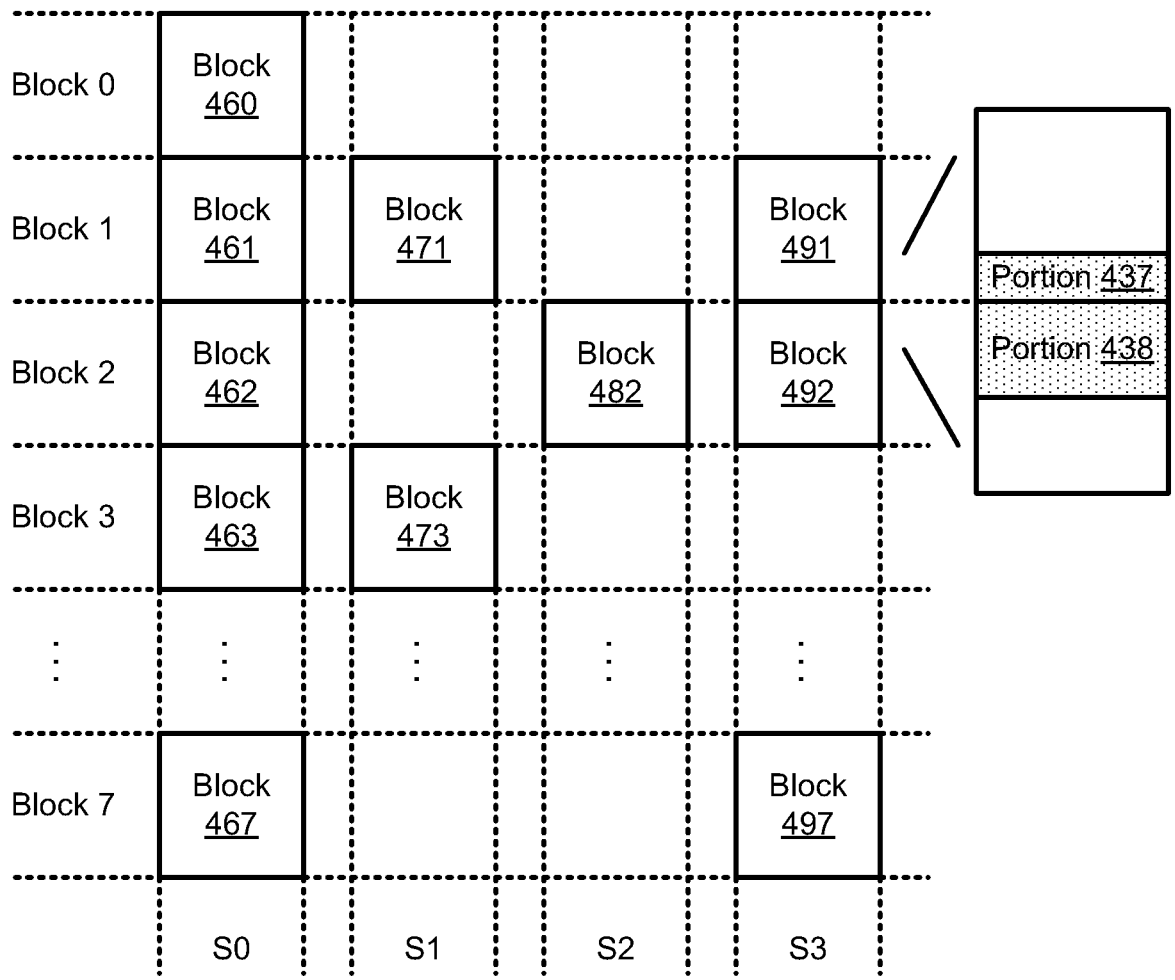
FIG. 4C depicts one embodiment of sets of data blocks corresponding with different point in time versions of a virtual machine.

FIG. 4C depicts one embodiment of sets of data blocks corresponding with different point in time versions of a virtual machine. Although the sets of data blocks depicted in FIG. 4C correspond with different point in time versions of a virtual machine, in other embodiments, the sets of data blocks may correspond with different point in time versions of a virtual disk, a database, or an electronic file (e.g., a spreadsheet).

As depicted, a first snapshot (S0) of the virtual machine includes eight data blocks comprising Block 460 through Block 467. In one example, each of the eight data blocks may comprise 1 GB of data corresponding with a combined full image snapshot size of 8 GB. The size of the data blocks may be set based on a total file size for the full image snapshot. In one example, if a full image snapshot comprises a file size that is greater than 4 GB, then the size of each of the data blocks may be set to 1 GB; however, if the full image snapshot comprises a file size that is less than or equal to 4 GB, then the size of each of the data blocks may be set to 256 MB. The second snapshot (S1) of the virtual machine includes two data blocks comprising Block 471 and Block 473. In this case, data differences between the first snapshot and the second snapshot only occurred in the data blocks corresponding with Block 471 and Block 473. The third snapshot (S2) of the virtual machine includes one data block Block 482. In this case, data changes occurring to the virtual machine between the second snapshot and the third snapshot only occurred in the data block corresponding with Block 482. The fourth snapshot (S3) of the virtual machine includes three data blocks comprising Block 491, Block 492, and Block 497. In this case, data changes occurring to the virtual machine between the third snapshot and the fourth snapshot only occurred in the data blocks corresponding with Block 491, Block 492, and Block 497.

A file stored on the virtual machine may reside on one or more of the data blocks. For example, a particular file (e.g., a database file) may include a bottom portion 437 of the data block 491 and a top portion 438 of the data block 492. In some embodiments, if a particular file is to be acquired or extracted from the fourth snapshot (S3) of the virtual machine, then only the bottom portion 437 of the data block 491 and the top portion 438 of the data block 492 may need to the read. Thus, the particular file may be extracted from the fourth snapshot without reading the entirety of the data blocks.

In one example, the 14 data blocks comprising Blocks 460-467, Block 471, Block 473, Block 482, Blocks 491-492, and Block 497 may be stored within a storage appliance, such as storage appliance 170 in FIG. 1A. The 14 data blocks may be transferred to an archival data store, such as the target storage 457 or the cloud-based archival target 458 in FIG. 4B, after being stored locally for a particular period of time (e.g., a week). The particular period of time may be adjusted depending on the total number of snapshots for the virtual machine stored using the storage appliance. In one example, a storage appliance may only store at most a threshold number of snapshots (e.g., at most 100 snapshots) before transferring older snapshots to the archival data store. The particular period of time may be adjusted depending on the total data size or disk size for the locally stored snapshots. In one example, a storage appliance may only store at most a threshold amount of data or store snapshots using a threshold amount of disk space (e.g., at most 8 GB of disk space) before transferring older snapshots to the archival data store.

Figure 4D:
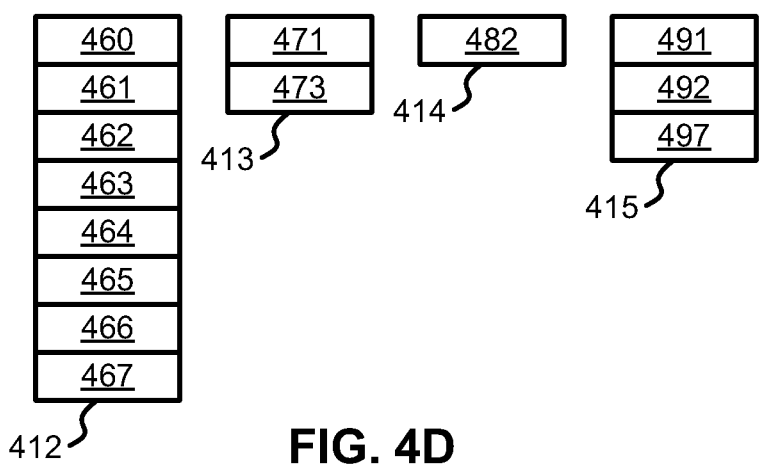
FIG. 4D depicts one embodiment of data blocks associated with a full image snapshot and three incremental snapshots for a virtual machine.

FIG. 4D depicts one embodiment of a full image snapshot of the virtual machine associated with the first snapshot (S0) and three incremental snapshots associated with snapshots S1-S3. The full image snapshot 412 of the virtual machine associated with the first snapshot (S0) includes the eight data blocks Blocks 460-467 depicted in FIG. 4C. The first incremental snapshot 413 associated with the second snapshot (S1) includes the two data blocks Block 471 and Block 473 depicted in FIG. 4C. The second incremental snapshot 414 associated with the third snapshot (S2) includes the one data block Block 482 depicted in FIG. 4C. The fourth incremental snapshot 415 associated with the fourth snapshot (S3) includes the three data blocks Blocks 491-492 and Block 497 depicted in FIG. 4C. The full image snapshot 412 and the three incremental snapshots 413-415 may be transferred or archived to an archival data store by transferring the 14 GBs of snapshot data corresponding with the 14 data blocks. Along with the actual data comprising the different point in time versions of the virtual machine, snapshot metadata comprising one or more snapshot mapping files and/or one or more fingerprint files may also be transferred to the archival data store.

Figures 4E, 4F, 4G, 4H, 4I:
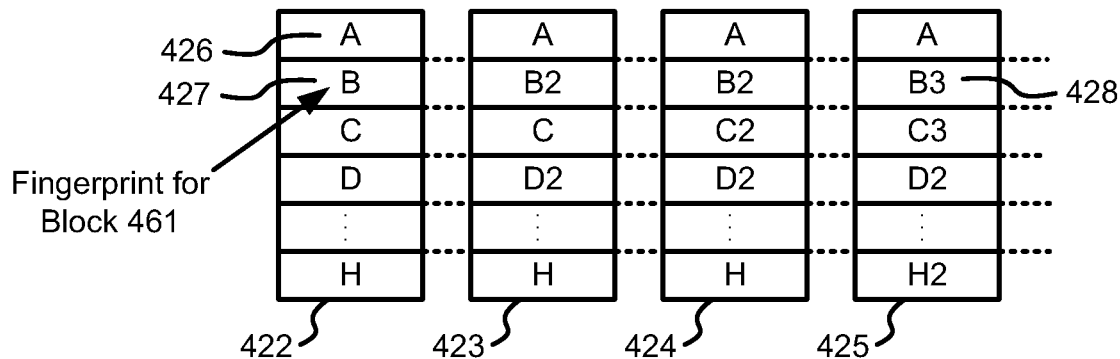
FIG. 4E depicts one embodiment of four fingerprint files.
FIGS. 4F-4I depict various embodiments of snapshot mapping files.

FIG. 4E depicts one embodiment of four fingerprint files 422-425 corresponding with the four snapshots (S0-S3) of the virtual machine depicted in FIG. 4C. The first fingerprint file 422 includes eight different fingerprints corresponding with the eight different data blocks for the first snapshot (S0 in FIG. 4C. A first fingerprint 426 (A) corresponds with the fingerprint for data block Block 460 in FIG. 4C. A second fingerprint 427 (B) corresponds with the fingerprint for data block Block 461 in FIG. 4C. The second fingerprint file 423 includes eight different fingerprints corresponding with the eight different data blocks for the second snapshot (S1) in FIG. 4C. In this case, the fingerprints (B2 and D2) for the data blocks Block 471 and Block 473 in FIG. 4C are different from the corresponding fingerprints (B and D) in the first snapshot (S0) due to data differences in the data blocks. The third fingerprint file 424 includes eight different fingerprints corresponding with the eight different data blocks for the third snapshot (S2) in FIG. 4C. In this case, a new fingerprint (C2) has been generated corresponding with block Block 482 in FIG. 4C. The fourth fingerprint file 425 includes eight different fingerprints corresponding with the eight different data blocks for the fourth snapshot (S3) in FIG. 4C. In this case, new fingerprint values (B3, C3, and H2) have been generated corresponding with blocks Blocks 491-492 and Block 497 in FIG. 4C. The third fingerprint 428 (B3) corresponding with the data within data block Block 491 in FIG. 4C may be generated using a cryptographic hashing algorithm.

The fingerprints for each data block may be generated using a fingerprinting algorithm. In some cases, the fingerprinting algorithm may comprise the Rabin fingerprint algorithm or a cryptographic hashing algorithm (e.g., MD5 or one of the SHA-family of algorithms). A fingerprint (or fingerprint value) may be used to uniquely or substantially identify the data within a data block. Fingerprint values may be compared in order to determine whether two data blocks contain identical data. In some cases, if a first data block and a second data block both generate the same fingerprint or signature and the first data block has already been acquired (e.g., from an archival data store), stored, or transferred (e.g., to an archival data store), then the second data block may not need to be acquired, stored, or transferred.

FIG. 4F depicts one embodiment of a snapshot mapping file for the fourth snapshot (S3) of the virtual machine depicted in FIG. 4C. As depicted, the fourth snapshot of the virtual machine maps to eight data blocks and includes pointers to Block 460, Block 491, Block 492, Block 473, and Block 497. In order to generate the fourth snapshot of the virtual machine, the snapshot mapping file may be used to identify and acquire only the eight data blocks necessary to generate or construct the fourth snapshot of the virtual machine.

FIG. 4G depicts one embodiment of a snapshot mapping file for the third snapshot (S2) of the virtual machine depicted in FIG. 4C. As depicted, the third snapshot of the virtual machine maps to eight data blocks and includes pointers to Block 460, Block 471, Block 482, Block 473, and Block 467. In order to generate the third snapshot of the virtual machine, the snapshot mapping file may be used to identify and acquire only the eight data blocks necessary to generate or construct the third snapshot of the virtual machine.

FIG. 4H depicts one embodiment of a snapshot mapping file for the second snapshot (S1) of the virtual machine depicted in FIG. 4C. As depicted, the second snapshot of the virtual machine maps to eight data blocks and includes pointers to Block 460, Block 471, Block 462, Block 473, and Block 467. In order to generate the second snapshot of the virtual machine, the snapshot mapping file may be used to identify and acquire only the eight data blocks necessary to generate or construct the second snapshot of the virtual machine.

FIG. 4I depicts one embodiment of a snapshot mapping file for the first snapshot (S0) of the virtual machine depicted in FIG. 4C. As depicted, the first snapshot of the virtual machine maps to eight data blocks and includes pointers to Block 460, Block 461, Block 462, Block 463, and Block 467. In order to generate the first snapshot of the virtual machine, the snapshot mapping file may be used to identify and acquire only the eight data blocks necessary to generate or construct the first snapshot of the virtual machine.

Figure 5A:
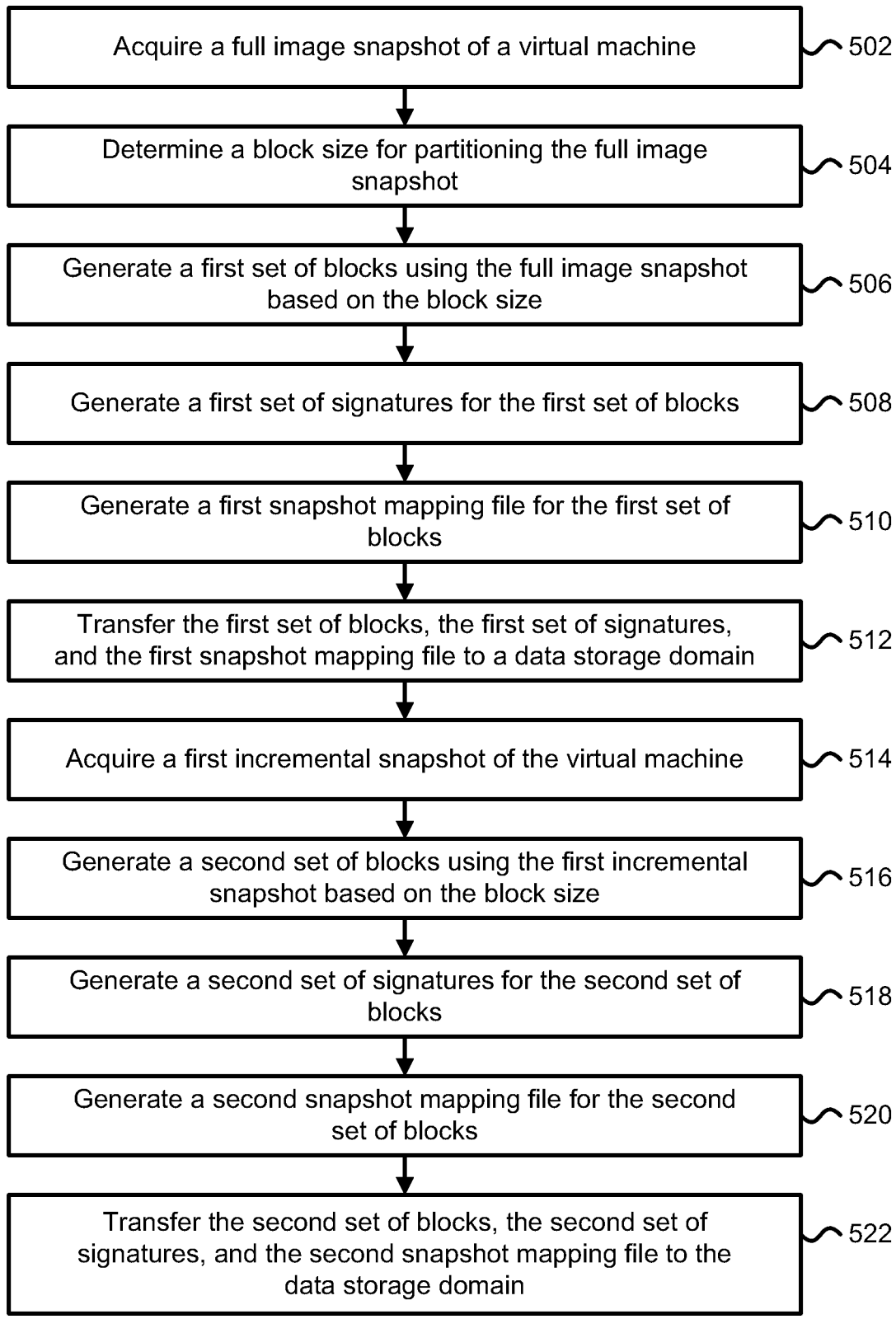
FIG. 5A is a flowchart describing one embodiment of a process for uploading snapshot data to an archival data store.

FIG. 5A is a flowchart describing one embodiment of a process for uploading snapshot data to an archival data store. In one embodiment, the process of FIG. 5A may be performed by a storage appliance, such as storage appliance 170 or storage appliance 140 in FIG. 1A. The process of FIG. 5A may also be performed using cloud-based computing resources or by generating and running virtual machines within a virtualized infrastructure.

In step 502, a full image snapshot of a virtual machine is acquired. The full image snapshot of the virtual machine may be acquired from a server, such as server 160 in FIG. 1A. In step 504, a block size for partitioning the full image snapshot is determined. In one embodiment, the block size for partitioning the full image snapshot may be determined based on a data size for the full image snapshot. In another embodiment, the block size for partitioning the full image snapshot may be determined based on a file type associated with the full image snapshot. In one example, if the full image snapshot corresponds with a virtual disk, then the block size may be set to 256 GB; however, if the full image snapshot corresponds with a spreadsheet or an electronic file that is less than 1 GB in size, then the block size may be set to 64 MB.

In step 506, a first set of blocks is generated using the full image snapshot based on the block size. In one example, the first set of blocks may comprise eight 1 GB blocks for an 8 GB full image snapshot. In step 508, a first set of signatures is generated for the first set of blocks. The first set of signatures may be generated by applying a cryptographic hashing algorithm (e.g., MD5) to each block of the first set of blocks. In step 510, a first snapshot mapping file is generated for the first set of blocks. The first snapshot mapping file may include pointers to data blocks corresponding with each of the first set of blocks. In step 512, the first set of blocks, the first set of signatures, and the first snapshot mapping file are transferred to a data storage domain. In one embodiment, the first set of blocks, the first set of signatures, and the first snapshot mapping file may be transferred from a local storage appliance, such as storage appliance 441 in FIG. 4A, to an archival data store, such as the cloud-based archival target 458 or the target storage 457 in FIG. 4A. The first set of blocks may correspond with snapshot data and the first set of signatures and the first snapshot mapping file may correspond with snapshot metadata. Both the snapshot data and the snapshot metadata may be transferred to an archival data store upon detection that an archival threshold for various snapshots has been satisfied. In one example, the snapshot data and the snapshot metadata may be transferred to the archival data store upon detection that the snapshots are older than a threshold number of days (e.g., are more than three days old).

In step 514, a first incremental snapshot of the virtual machine is acquired. The first incremental snapshot of the virtual machine may be acquired from a server, such as server 160 in FIG. 1A. In step 516, a second set of blocks is generated using the first incremental snapshot based on the block size. In one example, the first set of blocks may correspond with blocks Blocks 460-467 in FIG. 4C and the second set of blocks may correspond with blocks Block 471 and Block 473 in FIG. 4C. The block size may comprise a 64 MB block size or a 1 GB block size depending on the initial on-disk size for the full image snapshot. In step 518, a second set of signatures is generated for the second set of blocks. In one example, the first set of signatures may correspond with the fingerprint file 422 in FIG. 4E and the second set of signatures may correspond with the fingerprint file 423 in FIG. 4E. In step 520, a second snapshot mapping file is generated for the second set of blocks. In one example, the second snapshot mapping file may correspond with the snapshot mapping file depicted in FIG. 4H and the first snapshot mapping file may correspond with the snapshot mapping file depicted in FIG. 4I. In step 522, the second set of blocks, the second set of signatures, and the second snapshot mapping file are transferred to the data storage domain. The data storage domain may comprise an archival data store. The archival data store may comprise a cloud-based data store, an NFS datastore, a storage area network storage device, a networked-attached storage device, or a hardware data storage device.

Figure 5B:
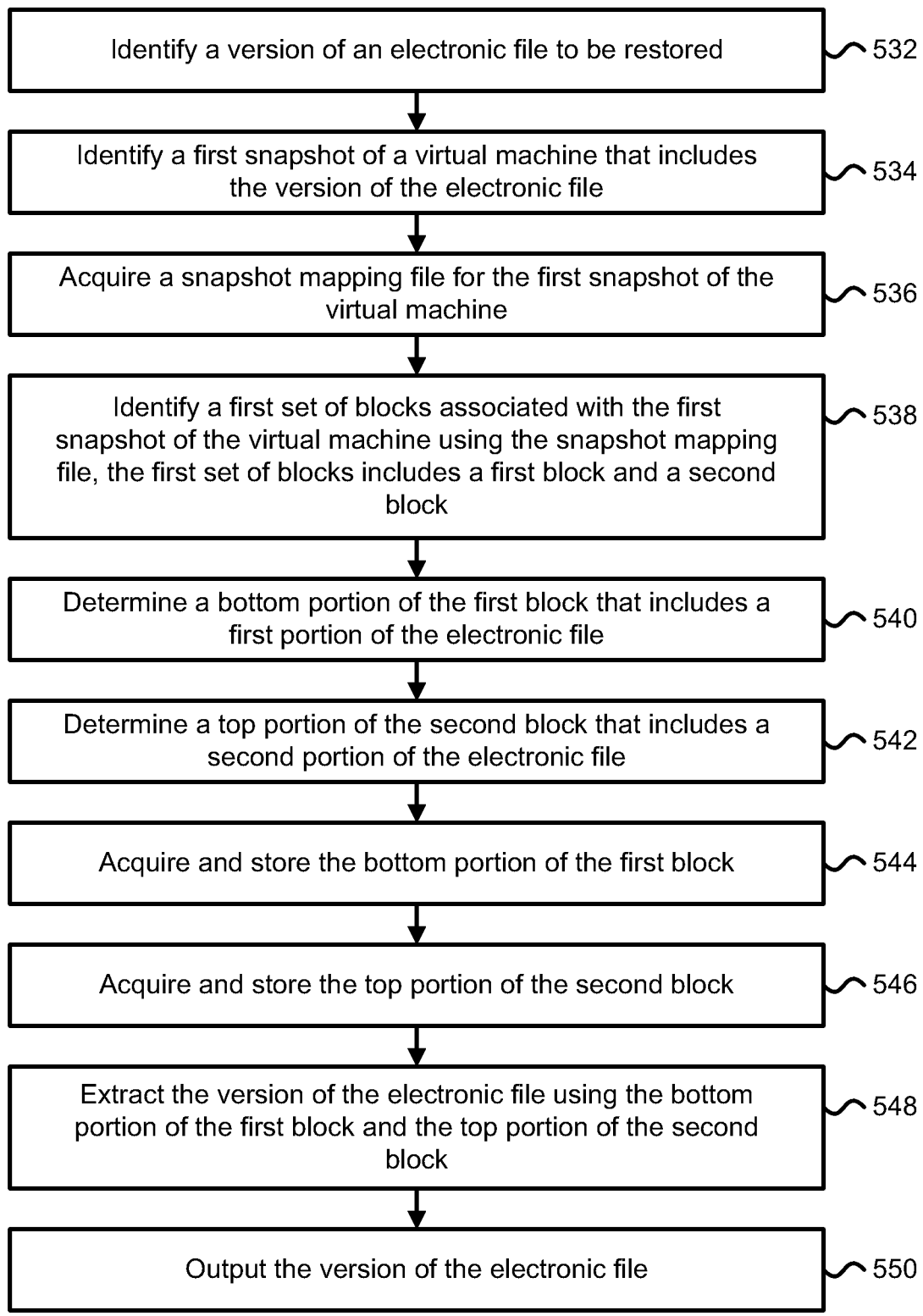
FIG. 5B is a flowchart describing one embodiment of a process for downloading snapshot data from an archival data store.

FIG. 5B is a flowchart describing one embodiment of a process for downloading snapshot data from an archival data store. In one embodiment, the process of FIG. 5B may be performed by a storage appliance, such as storage appliance 170 or storage appliance 140 in FIG. 1A. The process of FIG. 5B may also be performed using cloud-based computing resources or by generating and running virtual machines within a virtualized infrastructure.

In step 532, a version of an electronic file to be restored is identified. The electronic file may comprise a virtual disk file, a database file, or a spreadsheet file. In step 534, a first snapshot of a virtual machine that includes the version of electronic file is identified. In one embodiment, the first snapshot of the virtual machine that includes the version of electronic file may be identified using a virtual machine search index, such as the virtual machine search index 106 in FIG. 1C or the virtual machine search index depicted in FIG. 3D. In step 536, a snapshot mapping file for the first snapshot of the virtual machine is acquired. The snapshot mapping file may be acquired from an archival data store or from cloud-based data storage. In step 538, a first set of blocks associated with the first snapshot of the virtual machine is identified using the snapshot mapping file. The first set of blocks may include a first block and a second block. In one example, the snapshot mapping file may correspond with the snapshot mapping file depicted in FIG. 4F corresponding with the fourth snapshot (S3) of the virtual machine depicted in FIG. 4C.

In step 540, a bottom portion of the first block that includes a first portion of the electronic file is determined. In step 542, a top portion of the second block that includes a second portion of electronic file is determined. The bottom portion of the first block may correspond with portion 437 in FIG. 4C and the top portion of the second block may correspond with portion 438 in FIG. 4C. The bottom portion of the first block and the top portion of the second block may correspond with data offsets or location offsets within the data blocks. In one example, the portion 437 of the data block Block 491 in FIG. 4C may comprise data located between 900 MB and 1 GB of the 1 GB data block Block 491. The portion 438 of the data block Block 492 in FIG. 4C may comprise data located between the beginning of the 1 GB data block Block 492 and the first 200 MB of the 1 GB data block.

In one embodiment, the bottom portion of the first block and the top portion of the second block may be determined using one or more file system metadata files associated with the first snapshot of the virtual machine identified in step 534. The one or more file system metadata files may be located within a particular data block, such as data block Block 497 or data block Block 460 in FIG. 4C. The one or more file system metadata files may comprise NTFS metadata files, such as an NTFS Master File Table. The NTFS Master File Table may include information for retrieving files from an NTFS partition. The one or more file system metadata files may include a File Allocation Table. The one or more file system metadata files may include information for locating and retrieving particular files stored within a virtual disk of the virtual machine.

In step 544, the bottom portion of the first block is acquired and stored. In step 546, the top portion of the second block is acquired and stored. The portions of the first block and the second block may be acquired from an archival data store or a remote storage appliance and stored using a local storage appliance. The bottom portion of the first block may comprise less data than the data corresponding with the entire first block. The top portion of the second block may comprise less data than the data corresponding with the entire second block. In step 548, the version of electronic file is extracted using the bottom portion of the first block and the top portion of the second block. In step 550, the version of the electronic file is outputted. In one example, the version of the electronic file may be transmitted to a computing device, such as computing device 154 in FIG. 1A, or to a server, such as server 160 in FIG. 1A.

Figure 5C:
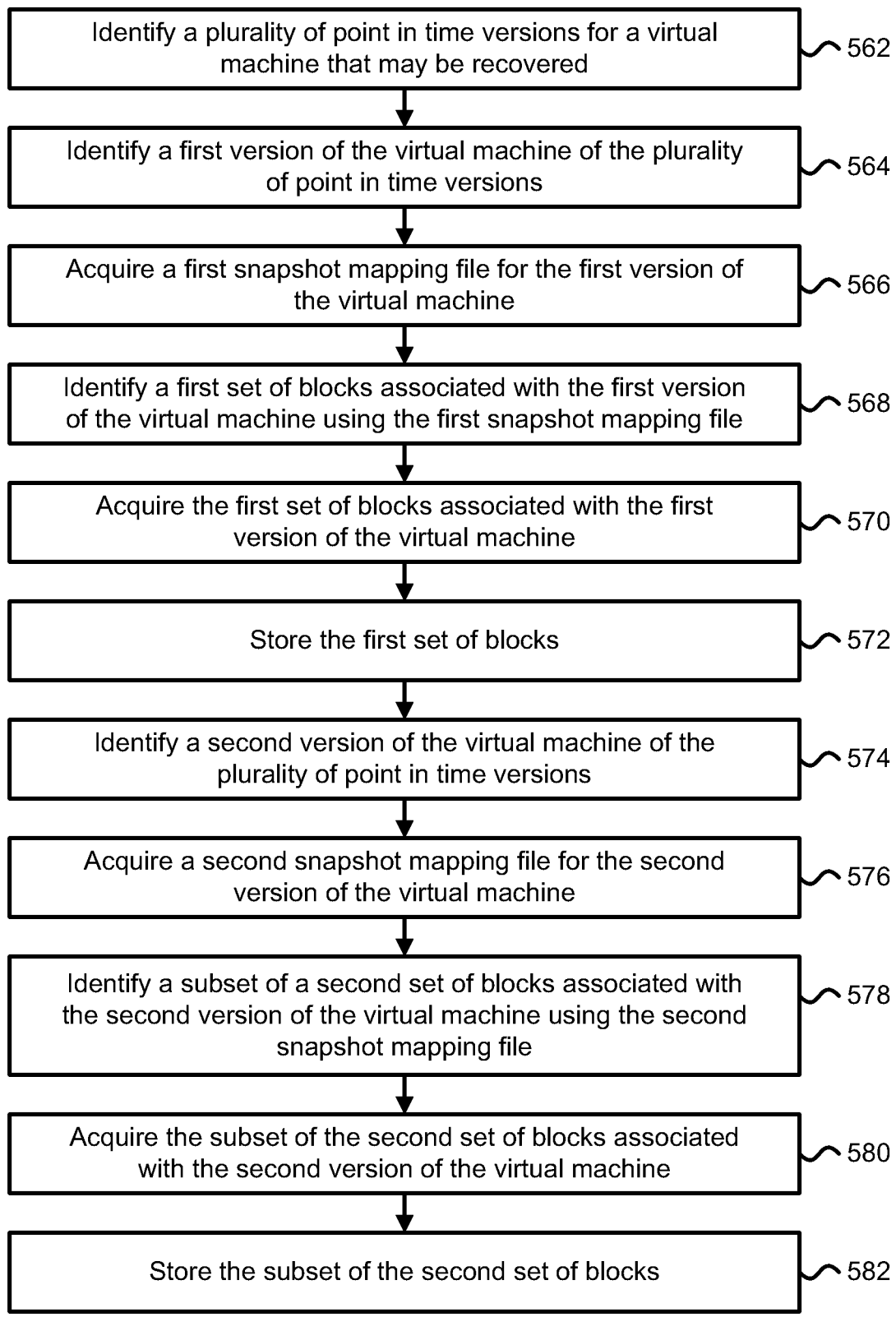
FIG. 5C is a flowchart describing another embodiment of a process for downloading snapshot data from an archival data store.

FIG. 5C is a flowchart describing another embodiment of a process for downloading snapshot data from an archival data store. In one embodiment, the process of FIG. 5C may be performed by a storage appliance, such as storage appliance 170 or storage appliance 140 in FIG. 1A. The process of FIG. 5C may also be performed using cloud-based computing resources or by generating and running virtual machines within a virtualized infrastructure.

In step 562, a plurality of point in time versions for a virtual machine that may be recovered is identified. In some cases, the plurality of point in time versions for the virtual machine that may be recovered may be identified by acquiring one or more snapshot mapping files from an archival data store for the virtual machine. Each of the one or more snapshot mapping files may correspond with or include pointers to data blocks for generating each of the point in time versions for the virtual machine. In step 564, a first version of the virtual machine of the plurality of point in time versions is identified. In one example, the first version may correspond with the most recent version of the virtual machine stored within the archival data store. In step 566, the first snapshot mapping file for the first version of the virtual machine is acquired. In step 568, a first set of blocks associated with the first version of the virtual machine is identified using the first snapshot mapping file. In one example, the first snapshot mapping file may correspond with the snapshot mapping file depicted in FIG. 4G and the first set of blocks associated with the first version of the virtual machine may correspond with the eight data blocks referenced by the snapshot mapping file depicted in FIG. 4G.

In step 570, the first set of blocks associated with the first version of the virtual machine is acquired. In step 572, the first set of blocks is stored. The first set of blocks may be acquired from an archival data store, such as a cloud-based data store or a remote cluster of data storage nodes, and may be stored using a local storage appliance or a local cluster of data storage nodes. In some cases, the first set of blocks may be acquired from an archival data store, such as the cloud-based archival target 458 or the target storage 457 in FIG. 4A. In step 574, a second version of the virtual machine of the plurality of point in time versions is identified. In one example, the first version may correspond with the third snapshot (S2) of the virtual machine depicted in FIG. 4C and the second version may correspond with the second snapshot (Si) depicted in FIG. 4C. In step 576, a second snapshot mapping file for the second version of the virtual machine is acquired. The second snapshot mapping file may be acquired from an archival data store, such as the cloud-based archival target 458 or the target storage 457 in FIG. 4A. In step 578, a subset of a second set of blocks associated with the second version of the virtual machine is identified using the second snapshot mapping file. In one example, the first set of blocks may correspond with the eight data blocks referenced by the snapshot mapping file depicted in FIG. 4G and the subset of the second set of blocks may correspond with data block Block 462 in FIG. 4C. In this case, the first set of blocks may include data blocks Block 460, Block 471, Block 482, Block 473, and Block 467 and the second set of blocks may include data blocks Block 460, Block 471, Block 462, Block 473, and Block 467. As data blocks Block 460, Block 471, Block 473, and Block 467 were acquired with the first set of blocks, those blocks do not need to be reacquired or downloaded from the archival data store. Instead, only data block Block 462 would need to be acquired or downloaded from the archival data store. Thus, the subset of the second set of blocks includes only data block Block 462.

In step 580, the subset of the second set of blocks associated with the second version of the virtual machine is acquired. In step 582, the subset of the second set of blocks is stored. In one embodiment, the first set of blocks may be acquired from an archival data store by a storage appliance during a first time period and the second set of blocks may be acquired from the archival data store by the storage appliance during a second time period subsequent to the first time period. In some cases, the first set of blocks and/or the second set of blocks may be cached using a non-volatile memory or an SSD.

One embodiment of the disclosed technology includes identifying a version of an electronic file to be restored, identifying a first snapshot of a virtual machine that includes the version of the electronic file, acquiring a snapshot mapping file for the first snapshot of the virtual machine, and identifying a subset of a first set of blocks associated with the first snapshot of the virtual machine using the snapshot mapping file. The subset includes a first block and a second block. The method further comprises determining a first portion of the first block that includes a first portion of the electronic file, determining a second portion of the second block that includes a second portion of the electronic file, acquiring the first portion of the first block and the second portion of the second block, extracting the version of the electronic file using the first portion of the first block and the second portion of the second block, and storing the version of the electronic file.

One embodiment of the disclosed technology includes identifying a first version of a virtual machine out of a plurality of point in time versions of the virtual machine stored within a data storage domain, acquiring a first snapshot mapping file for the first version of the virtual machine from the data storage domain, identifying a first set of blocks corresponding with the first version of the virtual machine using the first snapshot mapping file, acquiring the first set of blocks from the data storage domain, storing the first set of blocks, identifying a second version of the virtual machine out of the plurality of point in time versions of the virtual machine stored within the data storage domain, acquiring a second snapshot mapping file for the second version of the virtual machine from the data storage domain, identifying a subset of a second set of blocks corresponding with the second version of the virtual machine using the second snapshot mapping file, acquiring the subset of the second set of blocks from the data storage domain, and storing the subset of the second set of blocks.

One embodiment of the disclosed technology includes a memory (e.g., a volatile or non-volatile memory) in communication with one or more processors. The memory configured to store a first set of blocks corresponding with a first version of a virtual machine and a subset of a second set of blocks corresponding with a second version of the virtual machine. The one or more processors configured to identify the first version of the virtual machine out of a plurality of point in time versions of the virtual machine stored within a data storage domain and acquire a first snapshot mapping file for the first version of the virtual machine from the data storage domain. The one or more processors configured to identify the first set of blocks corresponding with the first version of the virtual machine using the first snapshot mapping file and acquire the first set of blocks from the data storage domain. The one or more processors configured to identify the second version of the virtual machine out of the plurality of point in time versions of the virtual machine stored within the data storage domain and acquire a second snapshot mapping file for the second version of the virtual machine from the data storage domain. The one or more processors configured to identify the subset of the second set of blocks corresponding with the second version of the virtual machine using the second snapshot mapping file and acquire the subset of the second set of blocks from the data storage domain.

The disclosed technology may be described in the context of computer-executable instructions, such as software or program modules, being executed by a computer or processor. The computer-executable instructions may comprise portions of computer program code, routines, programs, objects, software components, data structures, or other types of computer-related structures that may be used to perform processes using a computer. In some cases, hardware or combinations of hardware and software may be substituted for software or used in place of software.

Computer program code used for implementing various operations or aspects of the disclosed technology may be developed using one or more programming languages, including an object oriented programming language such as Java or C++, a procedural programming language such as the "C" programming language or Visual Basic, or a dynamic programming language such as Python or JavaScript. In some cases, computer program code or machine-level instructions derived from the computer program code may execute entirely on an end user's computer, partly on an end user's computer, partly on an end user's computer and partly on a remote computer, or entirely on a remote computer or server.

For purposes of this document, it should be noted that the dimensions of the various features depicted in the Figures may not necessarily be drawn to scale.

For purposes of this document, reference in the specification to "an embodiment," "one embodiment," "some embodiments," or "another embodiment" may be used to describe different embodiments and do not necessarily refer to the same embodiment.

For purposes of this document, a connection may be a direct connection or an indirect connection (e.g., via another part). In some cases, when an element is referred to as being connected or coupled to another element, the element may be directly connected to the other element or indirectly connected to the other element via intervening elements. When an element is referred to as being directly connected to another element, then there are no intervening elements between the element and the other element.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for operating a data management system, comprising:
   identifying a first version of a virtual machine out of a plurality of point in time versions of the virtual machine stored within a data storage domain;
   acquiring a first snapshot mapping file for the first version of the virtual machine from the data storage domain;
   identifying a first set of blocks corresponding with the first version of the virtual machine using the first snapshot mapping file, the first set of blocks including a first block and a second block;
   determining a first portion of the first block that includes a first portion of the first version of the virtual machine, wherein the first portion of the first block locates between a ninety percent and a hundred percent of a memory space of the first block;
   determining a second portion of the second block that includes a second portion of the first version of the virtual machine, wherein the second portion of the second block locates between a beginning and a twenty percent of a memory space of second block;
   acquiring the first portion of the first block and the second portion of the second block from the data storage domain;
   identifying a second version of the virtual machine out of the plurality of point in time versions of the virtual machine stored within the data storage domain;
   acquiring a second snapshot mapping file for the second version of the virtual machine from the data storage domain;
   identifying a subset of a second set of blocks corresponding with the second version of the virtual machine using the second snapshot mapping file, the subset of the second set of blocks including a new data block not included in the first set of blocks;
   acquiring the new data block from the subset of the second set of blocks from the data storage domain; and
   restoring a version of the virtual machine using the first portion of the first block and the second portion of the second block and the new data block from the subset of the second set of blocks.

2. The method of claim 1, wherein:
   the first version of the virtual machine corresponds with an incremental snapshot of the virtual machine stored within the data storage domain.

3. The method of claim 1, wherein:
   the first version of the virtual machine comprises the most recent version of the virtual machine stored within the data storage domain.

4. The method of claim 1, wherein:
   the data storage domain corresponds with a cloud-based data storage service.

5. The method of claim 1, wherein:
   the data storage domain comprises one of a cluster of data storage nodes, a storage area network storage device, a networked-attached storage device, or a hardware data storage device.

6. The method of claim 1, further comprising:
   determining a block size for the first set of blocks based on a combined data size for the first set of data blocks.

7. The method of claim 1, further comprising:
   identifying a version of an electronic file within the subset of the second set of blocks;

determining a first portion of a first block of the subset of the second set of blocks that includes a first portion of the electronic file;

determining a second portion of a second block of the subset of the second set of blocks that includes a second portion of the electronic file; and extracting the version of the electronic file by reading the first portion of the first block and the second portion of the second block.

8. A data management system, comprising:

a memory configured to store a first set of blocks corresponding with a first version of a virtual machine and a subset of a second set of blocks corresponding with a second version of the virtual machine; and one or more processors configured to identify the first version of the virtual machine out of a plurality of point in time versions of the virtual machine stored within a data storage domain and acquire a first snapshot mapping file for the first version of the virtual machine from the data storage domain, the one or more processors configured to identify the first set of blocks corresponding with the first version of the virtual machine using the first snapshot mapping file, the first set of blocks including a first block and a second block and determine a first portion of the first block that includes a first portion of the first version of the virtual machine, wherein the first portion of the first block locates between a ninety percent and a hundred percent of a memory space of the first block, the one or more processors configured to determine a second portion of the second block that includes a second portion of the first version of the virtual machine, wherein the second portion of the second block locates between a beginning and a twenty percent of a memory space of second block, the one or more processors configured to acquire the first portion of the first block and the second portion of the second block from the data storage domain, the one or more processors configured to identify the second version of the virtual machine out of the plurality of point in time versions of the virtual machine stored within the data storage domain and acquire a second snapshot mapping file for the second version of the virtual machine from the data storage domain, the one or more processors configured to identify the subset of the second set of blocks corresponding with the second version of the virtual machine using the second snapshot mapping file, the subset of the second set of blocks including a new data block not included in the first set of blocks, and acquire the new data block from the subset of the second set of blocks from the data storage domain.

9. The data management system of claim 8, wherein:
the first version of the virtual machine corresponds with an incremental snapshot of the virtual machine stored within the data storage domain.

10. The data management system of claim 8, wherein:
the first version of the virtual machine corresponds with the most recent snapshot of the virtual machine stored within the data storage domain.

11. The data management system of claim 8, wherein:
the data storage domain corresponds with a cloud-based data storage service.

12. The data management system of claim 8, wherein:
the data storage domain comprises one of a cluster of data storage nodes, a cloud-based data store, a Network File System (NFS) datastore, a storage area network storage device, a networked-attached storage device, or a hardware data storage device.

13. The data management system of claim 8, wherein:
the one or more processors configured to determine a block size for the first set of blocks based on a combined data size for the first set of data blocks and transfer the first set of blocks to the data storage domain.

14. The data management system of claim 8, wherein:
the one or more processors configured to identify a version of an electronic file within the subset of the second set of blocks and determine a first portion of a first block of the subset of the second set of blocks that includes a first portion of the electronic file, the one or more processors configured to determine a second portion of a second block of the subset of the second set of blocks that includes a second portion of the electronic file and extract the version of the electronic file using only the first portion of the first block and the second portion of the second block.

15. A method for operating a data management system, comprising:

identifying a version of an electronic file to be restored;

identifying a first snapshot of a virtual machine that includes the version of the electronic file;

acquiring a snapshot mapping file for the first snapshot of the virtual machine;

identifying a subset of a first set of blocks associated with the first snapshot of the virtual machine using the snapshot mapping file, the subset including a first block and a second block;

determining a first portion of the first block that includes a first portion of the electronic file, wherein the first portion of the first block locates between a ninety percent and a hundred percent of a memory space of the first block;

determining a second portion of the second block that includes a second portion of the electronic file, wherein the second portion of the second block locates between a beginning and a twenty percent of a memory space of the second block;

acquiring the first portion of the first block and the second portion of the second block;

extracting the version of the electronic file using the first portion of the first block and the second portion of the second block; and storing the version of the electronic file.

16. The method of claim 15, wherein:
the acquiring the first portion of the first block and the second portion of the second block comprises concurrently acquiring the first portion of the first block and the second portion of the second block.

17. The method of claim 15, wherein:
the version of the electronic file corresponds with the most recent version of a virtual disk stored within a data storage domain.

18. The method of claim 15, wherein:
the first snapshot of the virtual machine corresponds with an incremental snapshot of the virtual machine stored within a data storage domain.

* * * * *

UNITED STATES PATENT AND TRADEMARK OFFICE
CERTIFICATE OF CORRECTION

PATENT NO.         : 10,795,774 B2                                            Page 1 of 1
APPLICATION NO.    : 15/876104
DATED              : October 6, 2020
INVENTOR(S)        : Pandey et al.

It is certified that error appears in the above-identified patent and that said Letters Patent is hereby corrected as shown below:

In the Specification

In Column 25, Lines 43-44, delete "/snapshots/V_A/s100/s100.full)" and insert --/snapshots/VM_A/s100/s100.full)-- therefor In Column 29, Line 44, delete "(S0" and insert --(S0)-- therefor In Column 33, Line 52, delete "(Si)" and insert --(S1)-- therefor Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*